US011658415B2

(12) United States Patent
Park et al.

(10) Patent No.: US 11,658,415 B2
(45) Date of Patent: May 23, 2023

(54) ANTENNA MODULE SUPPORTING OF SENSING DISTANCE AND ELECTRONIC DEVICE INCLUDING THE SAME

(71) Applicant: Samsung Electronics Co., Ltd., Suwon-si (KR)

(72) Inventors: Daehee Park, Suwon-si (KR); Chonghwa Seo, Suwon-si (KR); Jongwon Lee, Suwon-si (KR); Janghoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 17/031,698

(22) Filed: Sep. 24, 2020

(65) Prior Publication Data

US 2021/0091465 A1 Mar. 25, 2021

(30) Foreign Application Priority Data

Sep. 24, 2019 (KR) .................. 10-2019-0117689

(51) Int. Cl.
 *H01Q 5/28* (2015.01)
 *H04W 52/14* (2009.01)
 (Continued)

(52) U.S. Cl.
 CPC ............. *H01Q 5/28* (2015.01); *H01Q 1/002* (2013.01); *H01Q 21/24* (2013.01); *H04W 52/146* (2013.01); *H04W 52/283* (2013.01)

(58) Field of Classification Search
 CPC .......... H01Q 5/28; H01Q 1/002; H01Q 21/24; H01Q 1/243; H01Q 21/28; H01Q 21/064;
 (Continued)

(56) References Cited

U.S. PATENT DOCUMENTS 8,781,420 B2 7/2014 Schlub et al.
9,071,336 B2 6/2015 Schlub et al.
(Continued)

FOREIGN PATENT DOCUMENTS

KR 10-1488889 B1 2/2015
KR 10-2016-0050083 A 5/2016
(Continued)

OTHER PUBLICATIONS

Notification of Transmittal of the International Search Report and the Written Opinion of the International Searching Authority, or the Declaration dated Jan. 18, 2021 in connection with International Patent Application No. PCT/KR2020/012810, 9 pages.

*Primary Examiner* — Shaima Q Aminzay

(57) ABSTRACT

Disclosed is an electronic device including an antenna module including a first antenna element and a second antenna element, and a processor operatively connected to the antenna module. The processor may be configured to transmit a first signal through the first antenna element, to receive a second signal including a signal obtained as the first signal is reflected by a target object, through the second antenna element, to calculate a distance from the antenna module to the target object based on a phase of the second signal, and to reduce a power level of the antenna module when the distance to the target object is smaller than a reference distance. In addition, various embodiments as understood from the specification are also possible.

19 Claims, 26 Drawing Sheets

(51) Int. Cl.
*H04W 52/28* (2009.01)
*H01Q 1/00* (2006.01)
*H01Q 21/24* (2006.01)

(58) Field of Classification Search
CPC . H04W 52/146; H04W 52/283; H04W 52/42; H04B 17/103; G01S 13/08; G01S 7/40
USPC .......................................................... 455/522
See application file for complete search history.

(56) References Cited

U.S. PATENT DOCUMENTS

| | | |
|---|---|---|
| 10,018,702 B2 | 7/2018 | Schrabler et al. |
| 2009/0231184 A1* | 9/2009 | Ding ........................ G01S 13/42 |
| | | 342/147 |
| 2011/0250928 A1* | 10/2011 | Schlub .................... H04W 8/22 |
| | | 455/73 |
| 2016/0161609 A1 | 6/2016 | Tanaka et al. |
| 2019/0154439 A1 | 5/2019 | Binder |

FOREIGN PATENT DOCUMENTS

| | | |
|---|---|---|
| KR | 10-1660137 B1 | 9/2016 |
| KR | 10-2018-0010300 A | 1/2018 |

* cited by examiner

1000

| Format | Symbol Number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 28 | D | D | D | D | D | D | D | D | D | D | D | D | F | U |
| 29 | D | D | D | D | D | D | D | D | D | D | D | F | F | U |

ANTENNA MODULE SUPPORTING OF SENSING DISTANCE AND ELECTRONIC DEVICE INCLUDING THE SAME

CROSS-REFERENCE TO RELATED APPLICATION

This application is based on and claims priority under 35 U.S.C. § 119 to Korean Patent Application No. 10-2019-0117689 filed on Sep. 24, 2019 in the Korean Intellectual Property Office, the disclosure of which is incorporated by reference herein its entirety.

BACKGROUND

1. Field

The disclosure relates to an antenna technology supporting a function of sensing a distance.

2. Description of Related Art

As an electronic device is popularized, the network traffic of the electronic device (e.g., a smartphone) is sharply increasing. To make the traffic better, a next-generation mobile communication technology using a signal in an ultra-high-frequency band, for example, a 5th-generation (5G) mobile communication technology (e.g., mmWave antenna technology) is being actively developed. The available bandwidth may become wider by using the 5G mobile communication technology, and thus, a significant amount of information may be transmitted or received.

The electronic device may include an antenna structure for the purpose of making use of the 5G mobile communication technology. Because the antenna structure has an effective isotropically radiated power (EIRP) greater than a single antenna, the antenna structure may transmit/receive various kinds of data more effectively.

The above information is presented as background information only to assist with an understanding of the disclosure. No determination has been made, and no assertion is made, as to whether any of the above might be applicable as prior art with regard to the disclosure.

SUMMARY

As the 5G mobile communication technology is commercialized, an electronic device needs to satisfy a maximum permissible exposure (MPE) restriction on electromagnetic waves in addition to a specific absorption rate (SAR) restriction. To satisfy the SAR restriction, the electronic device may recognize a distance of tens cm by making use of a grip sensor using the variation in a capacitance value or by using a carrier frequency. However, as a distance reference (e.g., a distance within 10 cm) of a range different from that of the SAR restriction is applied to the MPE restriction, the electronic device requires a distance sensing function different from that when only the SAR restriction is applied thereto. Meanwhile, to use an additional distance sensor to satisfy MPE restrictions require an additional internal space within the electronic device, thereby causing a decrease in the size of any other part (e.g., a battery).

Aspects of the disclosure are to address at least the above-mentioned problems and/or disadvantages and to provide at least the advantages described below. Accordingly, an aspect of the disclosure is to provide an electronic device sensing a distance to a target object (e.g., a human body) by using an antenna module for 5G mobile communication without an additional distance sensor and decreasing a power of the antenna module depending on the sensed distance.

In accordance with an aspect of the disclosure, an electronic device may include an antenna module including a first antenna element and a second antenna element, and a processor operatively connected to the antenna module. The processor may be configured to transmit a first signal through the first antenna element, to receive a second signal including a signal obtained as the first signal is reflected by a target object, through the second antenna element, to calculate a distance from the antenna module to the target object based on a phase of the second signal, and to reduce a power level of the antenna module when the distance to the target object is smaller than a reference distance.

In accordance with another aspect of the disclosure, an electronic device may include an antenna module including a first antenna element and a second antenna element, and a processor operatively connected to the antenna module. The processor may be configured to transmit a first signal through the first antenna element, to receive a second signal including a signal obtained as the first signal is reflected by a target object, through the second antenna element, to perform a radar operation, using the first signal when a power level of the second signal is less than a reference power level, to determine a phase change of the second signal when a distance, which is measured by the radar operation, from the antenna module to the target object is smaller than a reference distance, and to reduce a power level of the antenna module when the phase change of the second signal is greater than a reference phase change.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 is a table illustrating an example of a signal transmitting method used in an antenna module according to an embodiment;

DETAILED DESCRIPTION

FIGS. 1 through 25, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
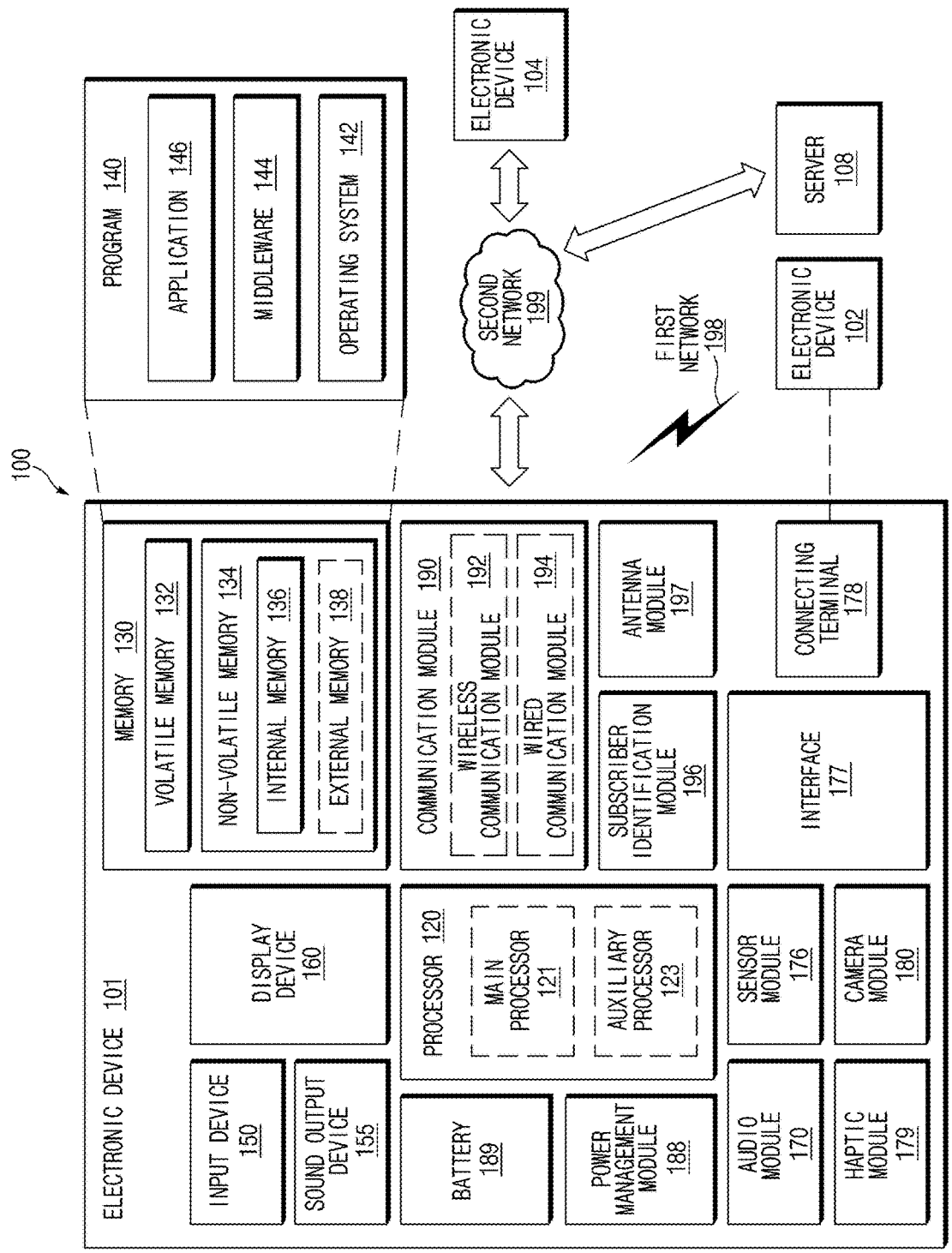
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
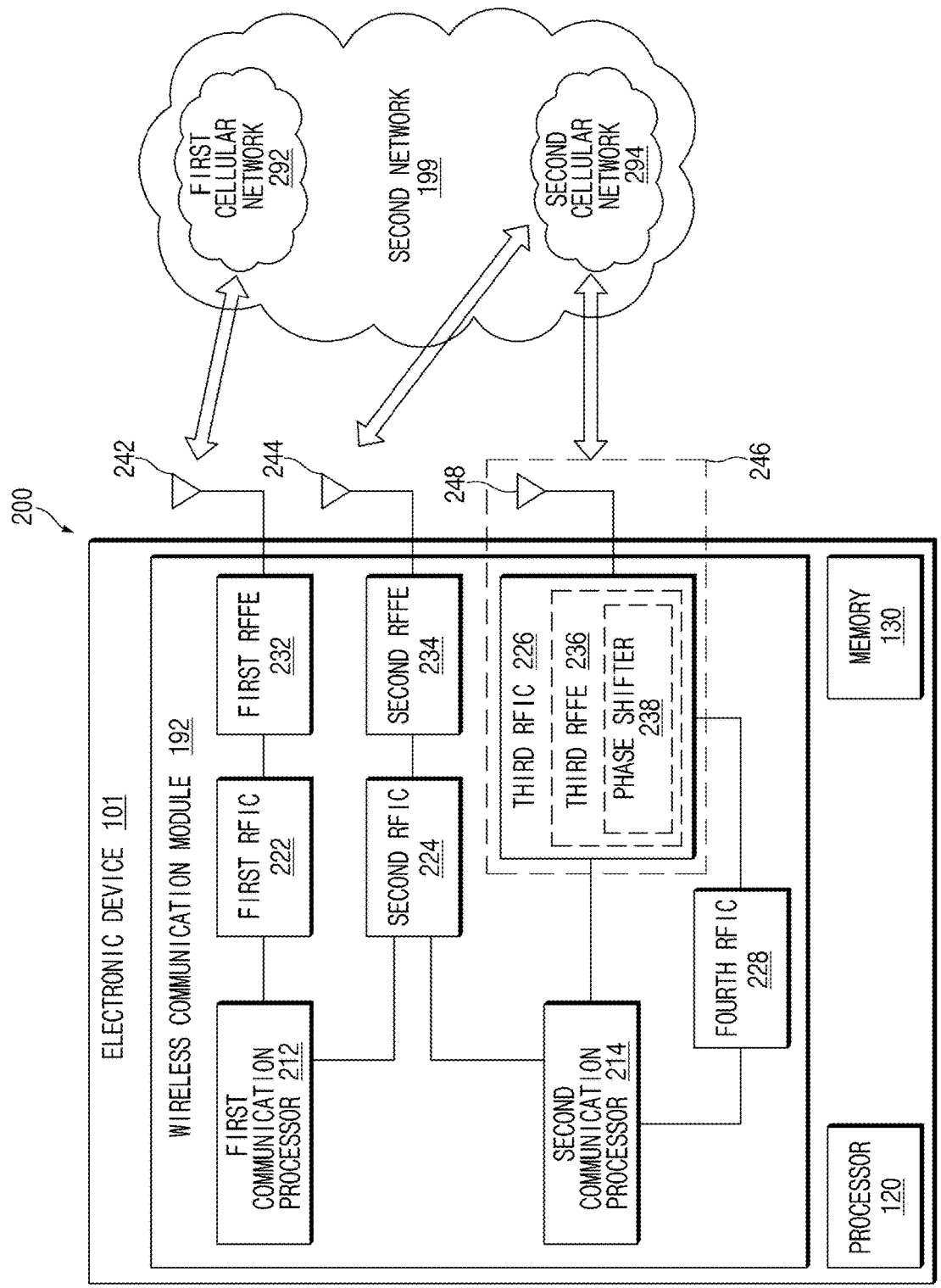
FIG. 2 is a block diagram of an electronic device for supporting legacy network communication and 5G network communication, according to various embodiments.

FIG. 2 is a block diagram 200 of an electronic device 101 for supporting legacy network communication and 5G network communication, according to various embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment, the electronic device 101 may further include at least one component of the components illustrated in FIG. 1, and the second network 199 may further include at least another network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted or may be included as a part of the third RFIC 226.

The first communication processor 212 may support the establishment of a communication channel of a band to be used for wireless communication with the first cellular network 292 and the legacy network communication through the established communication channel. According to various embodiments, the first cellular network 292 may be a legacy network including $2^{nd}$-generation (2G), $3^{rd}$- generation (3G), 4<sup>th</sup>-generation (4G), and/or long term evolution (LTE) network. The second communication processor 214 may support the establishment of a communication channel corresponding to a specified band (e.g., about 6 GHz about 60 GHz) among bands to be used for wireless communication with the second cellular network 294 and 5G network communication via the established communication channel. According to various embodiments, the second cellular network 294 may be a 5G network defined in the 3GPP. Additionally, according to an embodiment, the first communication processor 212 or the second communication processor 214 may establish a communication channel for a specified band (e.g., approximately 6 GHz or lower) of the bands to be used for wireless communication with the second cellular network 294 and may support 5G network communication through the established communication channel. According to an embodiment, the first communication processor 212 and the second communication processor 214 may be implemented within a single chip or a single package. According to various embodiments, the first communication processor 212 or the second communication processor 214 may be implemented within a single chip or a single package with the processor 120, the auxiliary processor 123 of FIG. 1, or the communication module 190.

In the case of transmitting a signal, the first RFIC 222 may convert a baseband signal generated by the first communication processor 212 into a radio frequency (RF) signal of approximately 700 MHz to approximately 3 GHz that is used in the first cellular network 292 (e.g., a legacy network). In the case of receiving a signal, an RF signal may be obtained from the first cellular network 292 (e.g., a legacy network) through an antenna (e.g., the first antenna module 242) and may be pre-processed through an RFFE (e.g., the first RFFE 232). The first RFIC 222 may convert the preprocessed RF signal into a baseband signal so as to be processed by the first communication processor 212.

In the case of transmitting a signal, the second RFIC 224 may convert a baseband signal generated by the first communication processor 212 or the second communication processor 214 into an RF signal (hereinafter referred to as a "5G Sub6 RF signal") in a Sub6 band (e.g., approximately 6 GHz or lower) used in the second cellular network 294 (e.g., a 5G network). In the case of receiving a signal, a 5G Sub6 RF signal may be obtained from the second cellular network 294 (e.g., a 5G network) through an antenna (e.g., the second antenna module 244) and may be pre-processed through an RFFE (e.g., the second RFFE 234). The second RFIC 224 may convert the pre-processed 5G Sub6 RF signal into a baseband signal so as to be processed by a corresponding communication processor of the first communication processor 212 or the second communication processor 214.

The third RFIC 226 may convert a baseband signal generated by the second communication processor 214 into an RF signal (hereinafter referred to as a "5G Above6 RF signal") in a 5G Above6 band (e.g., approximately 6 GHz to approximately 60 GHz) to be used in the second cellular network 294 (e.g., a 5G network). In the case of receiving a signal, a 5G Above6 RF signal may be obtained from the second cellular network 294 (e.g., a 5G network) through an antenna (e.g., the antenna 248) and may be pre-processed through a third RFFE 236. For example, the third RFFE 236 may perform pre-processing on a signal by using a phase shifter 238. The third RFIC 226 may convert the preprocessed 5G Above6 RF signal to a baseband signal so as to be processed by the second communication processor 214. According to an embodiment, the third RFFE 236 may be implemented as a part of the third RFIC 226.

According to an embodiment, the electronic device 101 may include the fourth RFIC 228 independently of the third RFIC 226 or as at least part of the third RFIC 226. In this case, the fourth RFIC 228 may convert a baseband signal generated by the second communication processor 214 into an RF signal (hereinafter referred to as an "intermediate frequency (IF) signal") in an intermediate frequency band (e.g., approximately 9 GHz to approximately 11 GHz) and may provide the IF signal to the third RFIC 226. The third RFIC 226 may convert the IF signal into a 5G Above6 RF signal. In the case of receiving a signal, a 5G Above6 RF signal may be received from the second cellular network 294 (e.g., a 5G network) through an antenna (e.g., the third antenna 248) and may be converted into an IF signal by the third RFIC 226. The fourth RFIC 228 may convert the IF signal into a baseband signal to be processed by the second communication processor 214.

According to an embodiment, the first RFIC 222 and the second RFIC 224 may be implemented with at least part of a single chip or a single package. According to an embodiment, the first RFFE 232 and the second RFFE 234 may be implemented as at least part of a single chip or a single package. According to an embodiment, at least one of the first antenna module 242 or the second antenna module 244 may be omitted or may be combined with any other antenna module to process RF signals in a plurality of bands.

According to an embodiment, the third RFIC 226 and the antenna 248 may be disposed at the same substrate to form a third antenna module 246. For example, the wireless communication module 192 or the processor 120 may be disposed on a first substrate (e.g., a main PCB). In this case, the third RFIC 226 may be disposed in a partial region (e.g., on a lower surface) of a second substrate (e.g., a sub PCB) independent of the first substrate, and the antenna 248 may be disposed in another partial region (e.g., on an upper surface) of the second substrate. As such, the third antenna module 246 may be formed. According to an embodiment, the antenna 248 may include, for example, an antenna array to be used for beamforming. As the third RFIC 226 and the antenna 248 are disposed at the same substrate, it may be possible to decrease a length of a transmission line between the third RFIC 226 and the antenna 248. For example, the decrease in the transmission line may make it possible to prevent a signal in a high-frequency band (e.g., approximately 6 GHz to approximately 60 GHz) used for the 5G network communication from being lost (or attenuated) due to the transmission line. For this reason, the electronic device 101 may improve the quality or speed of communication with the second cellular network 294 (e.g., 5G network).

The second cellular network 294 (e.g., a 5G network) may be used independently of the first cellular network 292 (e.g., a legacy network) (e.g., this scheme being called "stand-alone (SA)") or may be used in connection with the first cellular network 292 (e.g., this scheme being called "non-stand alone (NSA)"). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may then access an external network (e.g., Internet) under control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 230 and may be accessed by another component (e.g., the processor 120, the first communication processor 212, or the second communication processor 214).

Figure 3:
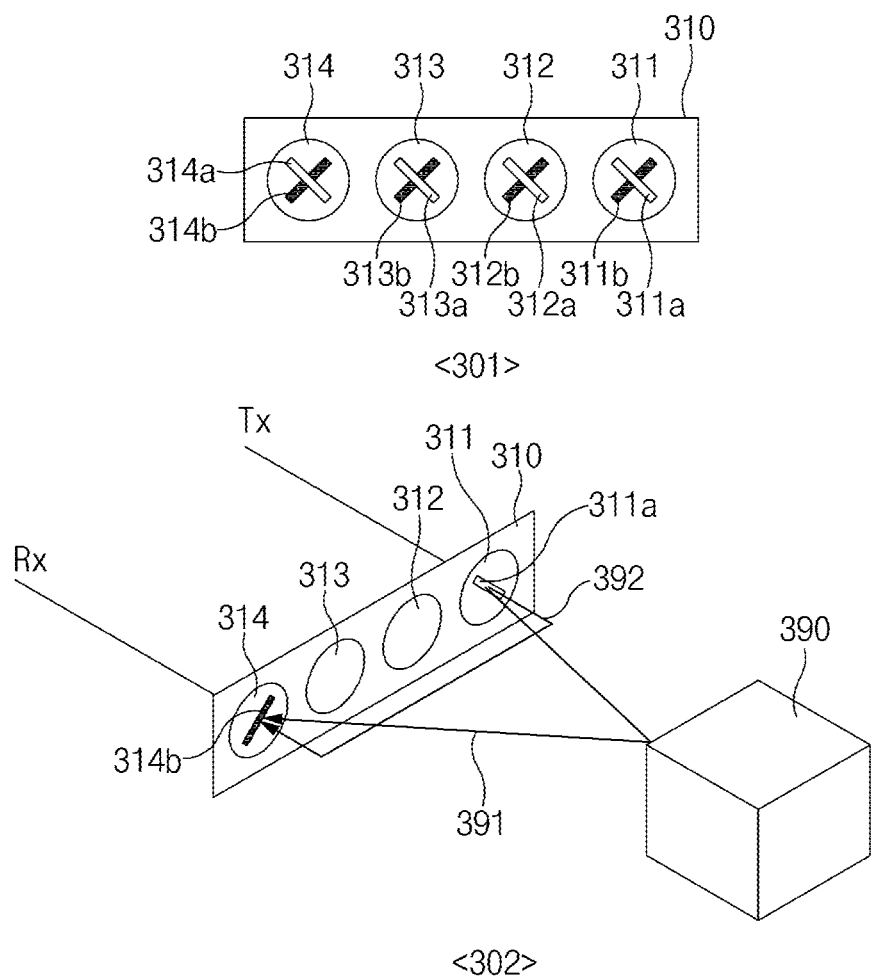
FIG. 3 is a view illustrating an antenna module according to an embodiment.
Figure 4:
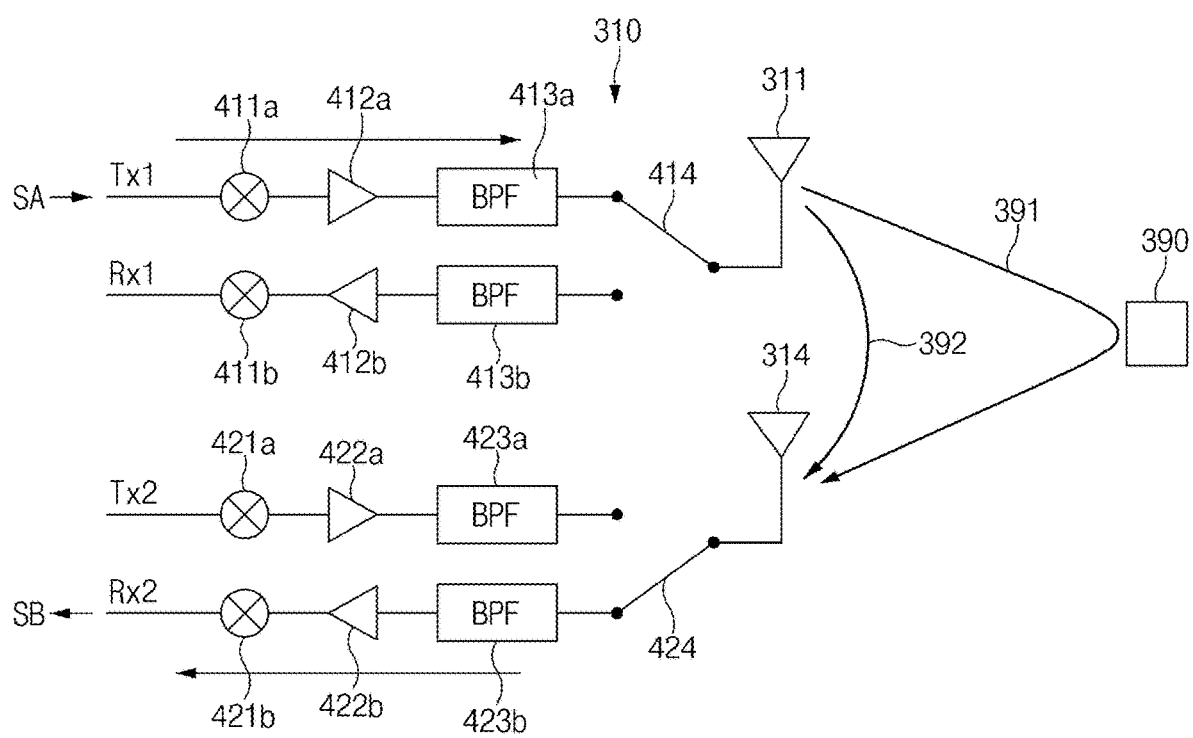
FIG. 4 is a diagram illustrating a method of measuring a distance using an antenna module according to an embodiment.
Figure 5:
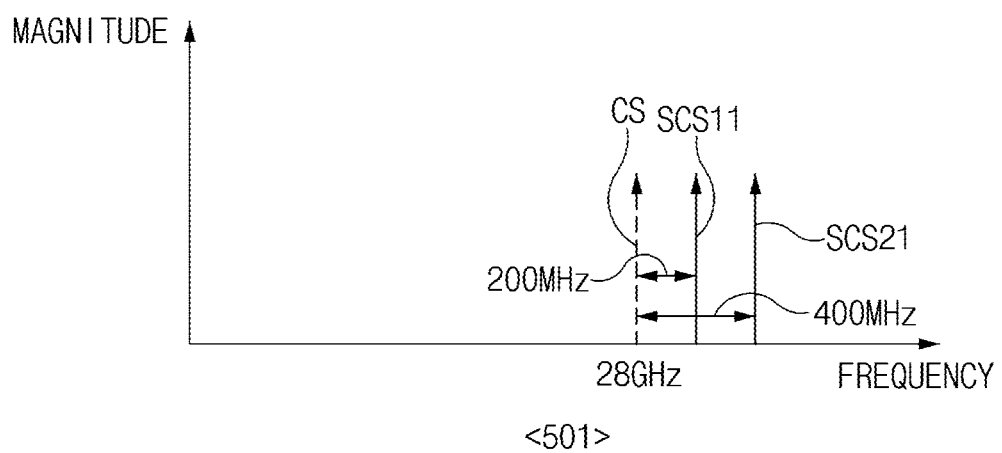
FIG. 5 illustrates an example of a carrier frequency used in an antenna module according to an embodiment.
Figure 5:
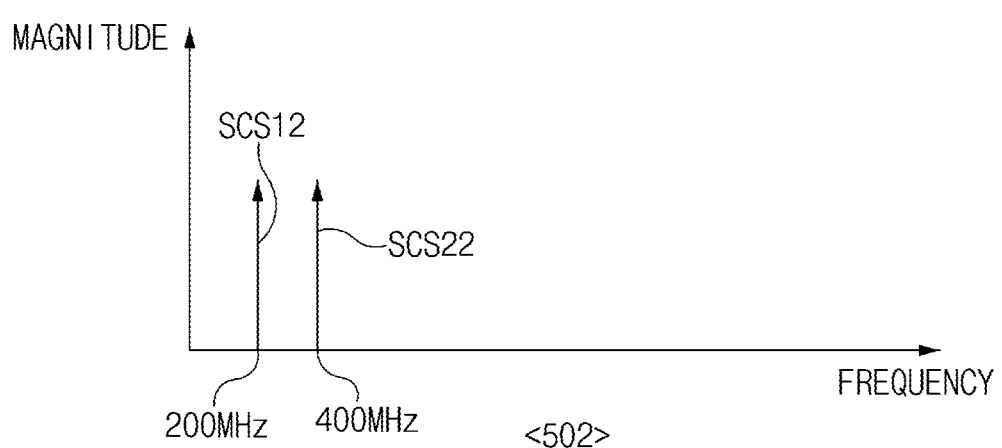
Figure 6:
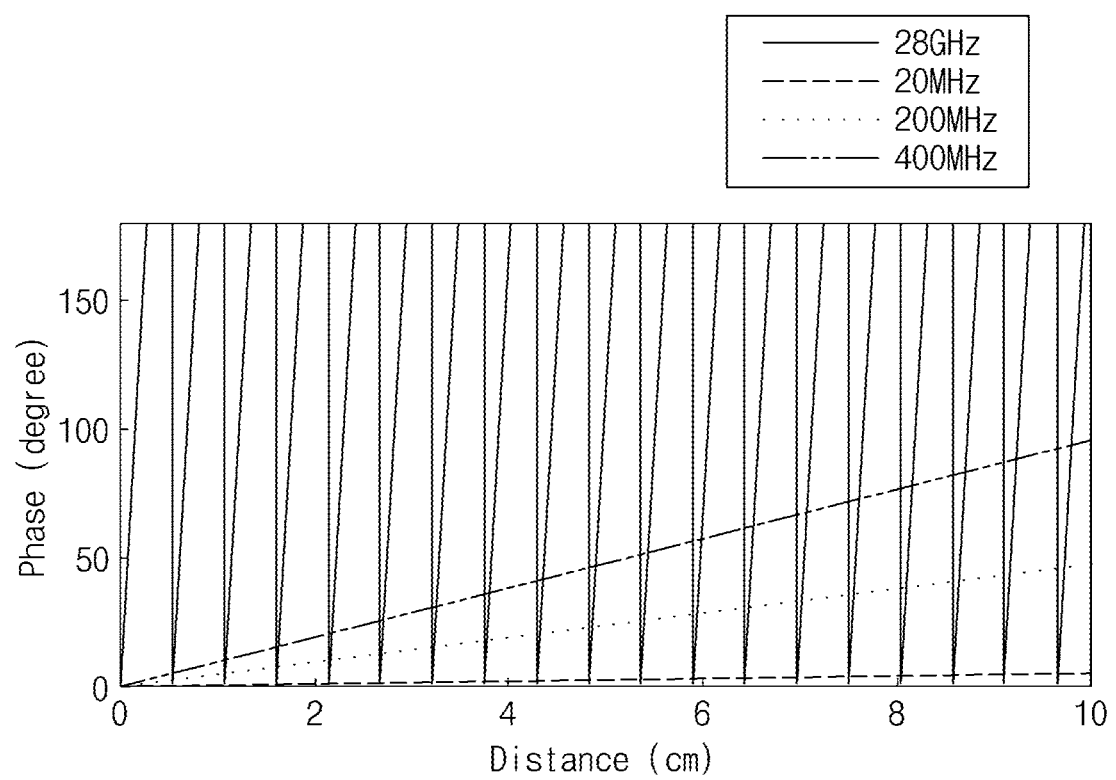
FIG. 6 is a graph illustrating a relationship between a distance to a target object and phases of reflected signals corresponding to various carrier frequencies used in an antenna module, according to an embodiment.

FIG. 3 is a view illustrating an antenna module according to an embodiment. FIG. 4 is a diagram illustrating a method of measuring a distance using an antenna module according to an embodiment. FIG. 5 illustrates an example of a carrier frequency used in an antenna module according to an embodiment. FIG. 6 is a graph illustrating a relationship between a distance to a target object and phases of reflected signals corresponding to various carrier frequencies used in an antenna module, according to an embodiment.

Referring to FIG. 3, "301" indicates at least one antenna module 310 (e.g., the third antenna module 246) used in an electronic device (e.g., the electronic device 101). For example, the antenna module 310 may include an antenna module (e.g., 5G module or mmWave module) supporting 5G mobile communication. The antenna module 310 may include first to fourth antenna elements 311, 312, 313, and 314. Each of the first to fourth antenna elements 311, 312, 313, and 314 may be formed as a double polarized antenna. The first to fourth antenna elements 311, 312, 313, and 314 may be configured to transmit and receive antenna signals through first polarizations 311a, 312a, 313a, and 314a and second polarizations 311b, 312b, 313b, and 314b.

According to an embodiment, the antenna elements 311, 312, 313, and 314 may be a dipole antenna or patch antenna.

According to an embodiment, the first polarizations 311a, 312a, 313a, and 314a and the second polarizations 311b, 312b, 313b, and 314b may be paths for transmitting or receiving antenna signals to or from the antenna elements 311, 312, 313, and 314.

According to an embodiment, the first polarizations 311a, 312a, 313a, and 314a and the second polarizations 311b, 312b, 313b, and 314b may have independent feeding portions, respectively.

According to an embodiment, the antenna module 310 may measure the distance to the target object 390, using a double polarized antenna. For example, the antenna module 310 may transmit a reference signal SA and may receive a reception signal SB. The electronic device may measure the distance to a target object 390 by analyzing the reception signal SB. The antenna module 310 may transmit the reference signal SA, using the first polarization (e.g., the first polarization 311a) of at least one antenna element (e.g., the first antenna element 311). In addition, the antenna module 310 may receive the reception signal SB, using the second polarization (e.g., the second polarization 314a) of at least another antenna element (e.g., the fourth antenna element 314). Accordingly, the antenna module 310 may receive the reception signal SB while transmitting the reference signal SA. For example, the reception signal SB may include the reflection signal, which obtained by being received through the reflection path 391 after being reflected by the target object 390, and a coupling signal, which is obtained by being received through the coupling path 392 due to the interference between the transmitting and receiving antenna elements. The antenna module 310 may remove the coupling signal from the reception signal SB, may obtain phase information of the reflection signal, and may estimate a distance to the target object 390 based on the phase information of the reflection signal.

According to an embodiment, the relationship between the delay time τ of the reflection signal and the phase φ of the reflection signal, which is obtained by being reflected from the target object 390 and then returned to the antenna module 310, may be expressed as shown in Equation 1. In Equation 1, $f_s$ represents the frequency of the reference signal SA.

$$\phi = 2\pi f_s \tau \text{(rad)} \qquad \text{[Equation 1]}$$

In addition, the delay time τ of the reflection signal and the distance 'd' to the target object 390 may be expressed as Equation 2.

$$\tau = 2d \cdot c^{-1} \text{ (sec)} \qquad \text{[Equation 2]}$$

Accordingly, the antenna module 310 may calculate the phase φ of the reflection signal and may obtain the distance "d" to the target object 390 through Equation 1 and Equation 2. FIG. 6 is a graph illustrating the relationship between the phase φ of the reflection signal corresponding to the reference signal SA of various frequencies (e.g., 20 MHz, 200 MHz, 400 MHz, and 28 GHz) and the distance "d" to the target object 390. For example, because the phase of the reflection signal is severely changed at a specified distance (e.g., between 2 cm and 10 cm), it is difficult to use the reference signal SA of 28 GHz to measure a distance. Furthermore, because the phase of the reflection signal is hardly changed at the specified distance (e.g., between 2 cm and 10 cm), it is difficult to use the reference signal SA of 20 MHz to measure a distance. On the other hand, because the phase change of the reflection signal is linear at the specified distance (e.g., between 2 cm and 10 cm), it is possible to use the reference signal SA of 200 MHz or 400 MHz to measure a distance.

According to an embodiment, referring to FIG. 5, an antenna module 310 used for 5G mobile communication may use a carrier signal CS of 28 GHz, for example. Moreover, the antenna module 310 may use subcarrier signals SCS11 and SCS21 having a frequency difference between 28 GHz and 200 MHz or 400 MHz, according to the orthogonal frequency division multiplexing (OFDM) bandwidth of the carrier signal CS (e.g., see graph 501). Referring to graph 502, the subcarrier signals SCS11 and SCS21 may be converted into a subcarrier signal SCS12 of 200 MHz and a subcarrier signal SCS22 of 400 MHz, when viewed from a baseband. Accordingly, the antenna module 310 may obtain the distance "d" to the target object 390, using at least one of the subcarrier signals SCS12 and SCS22.

Figure 7:
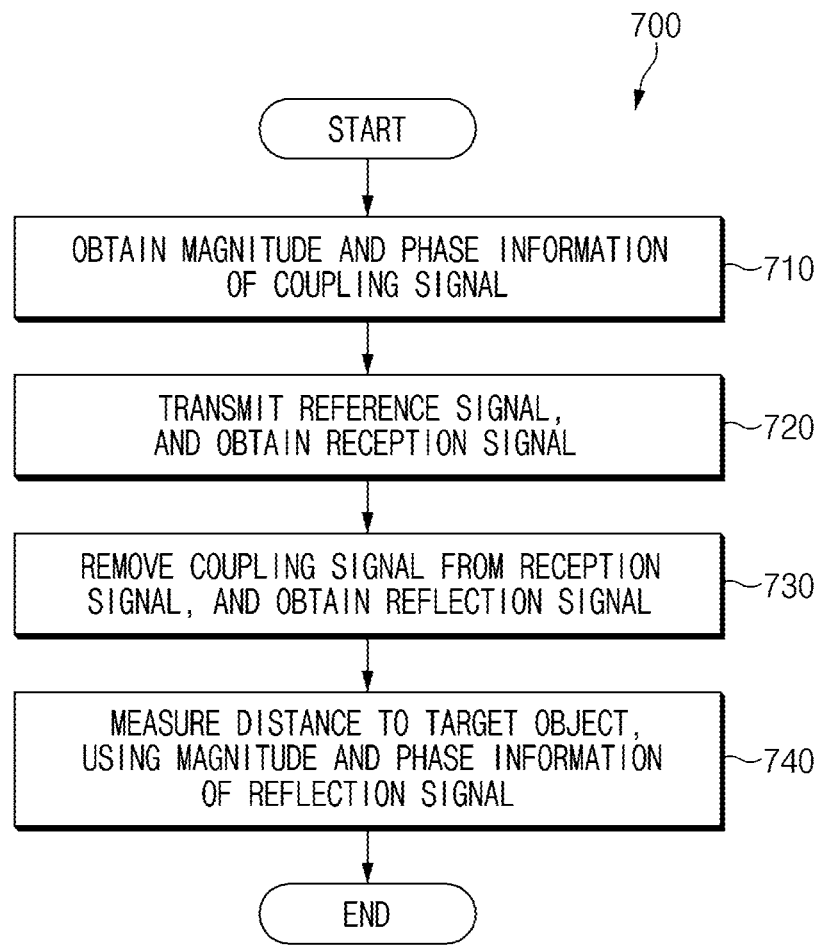
FIG. 7 is a flowchart illustrating a method of measuring a distance to a target object based on a phase of a reflection signal in an antenna module according to an embodiment.
Figure 8:
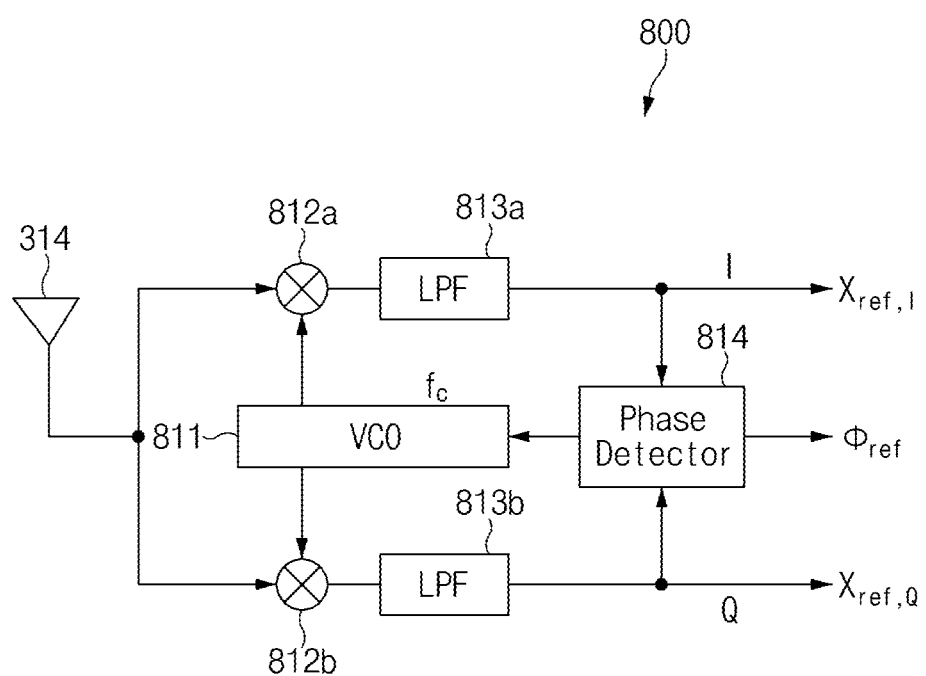
FIG. 8 illustrates an example of a coupling signal detection circuit included in an antenna module according to an embodiment.
Figure 9A:
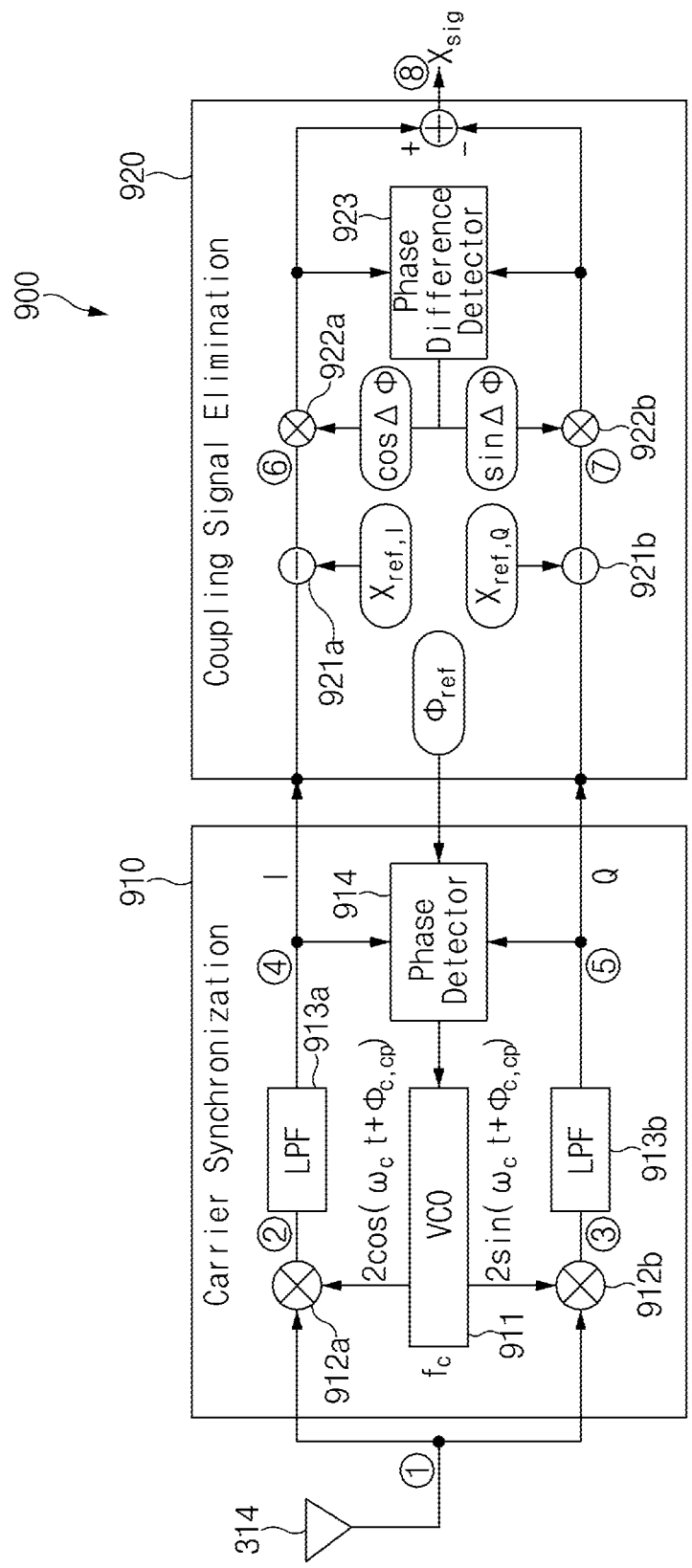
FIG. 9A illustrates an example of a carrier synchronization circuit and a coupling signal elimination circuit included in an antenna module according to an embodiment.
Figure 9B:
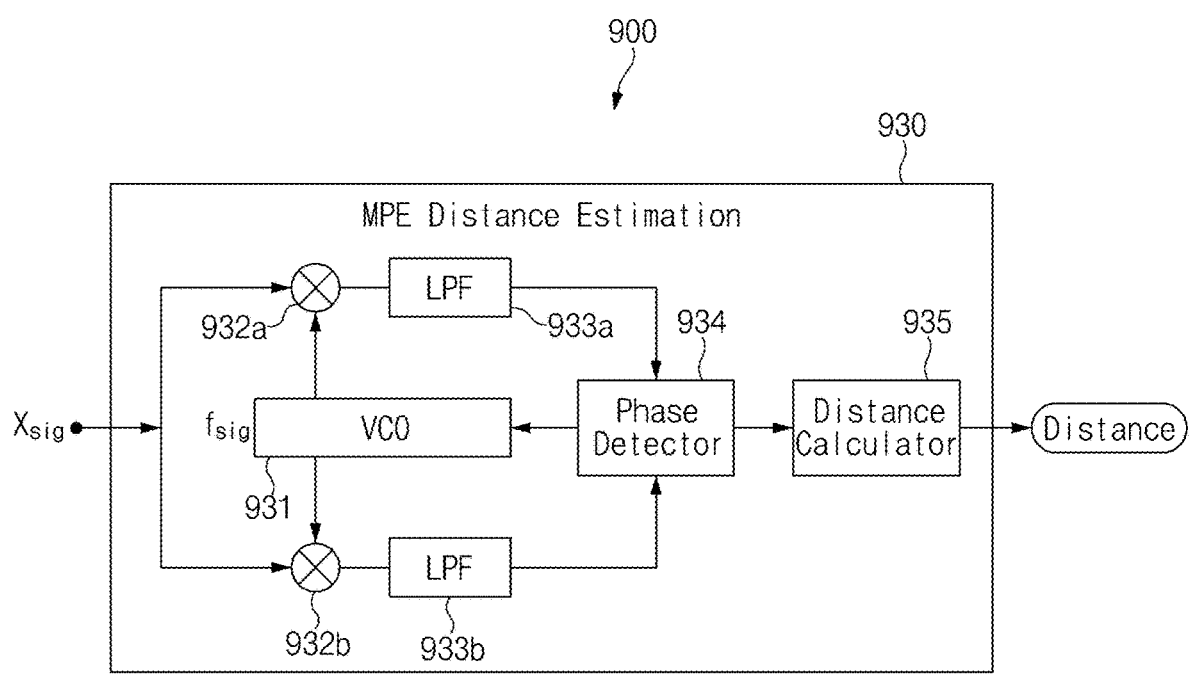
FIG. 9B illustrates an example of a distance estimation circuit included in an antenna module according to an embodiment.

FIG. 7 is a flowchart illustrating a method 700 of measuring a distance to a target object based on a phase of a reflection signal in an antenna module according to an embodiment. FIG. 8 illustrates an example of a coupling signal detection circuit 800 included in an antenna module according to an embodiment. FIG. 9A illustrates an example of a carrier synchronization circuit and a coupling signal elimination circuit included in an antenna module according to an embodiment. FIG. 9B illustrates an example of a distance estimation circuit included in an antenna module according to an embodiment. In FIGS. 9A and 9B, a carrier synchronization circuit 910, a coupling signal elimination circuit 920, and a distance estimation circuit 930 may constitute an MPE compensation circuit 900 of the antenna module 310.

According to an embodiment, in operation 710, the antenna module 310 may obtain the magnitude and phase information of the coupling signal in a state where the target object 390 is not present. For example, referring to FIG. 8, the antenna module 310 may transmit a reference signal SB through the first antenna element 311 (see FIG. 4); the antenna module 310 may receive the coupling signal through the fourth antenna element 314. The antenna module 310 may include a voltage controlled oscillator (VCO) 811, first and second mixers 812a and 812b, first and second low pass filters (LPFs) 813a and 813b, and a phase detector 814. The coupling signal received through the fourth antenna element 314 may be converted into I/Q signal through the first and second mixers 812a and 812b. The VCO 811 may deliver a signal for converting the coupling signal into the I/Q signal to the first and second mixers 812a and 812b. Only the I/Q signal of the desired frequency (e.g., 200 MHz or 400 MHz) may be selected through the first and second LPFs 813a and 813b. The antenna module 310 may obtain the I/Q component magnitudes $X_{ref,I}$ and $X_{ref,Q}$ of the coupling signal from the I/Q signal passing through the first and second LPFs 813a and 813b. The phase detector 814 may obtain the phase $\phi_{ref}$ of the coupling signal from the I/Q signal passing through the first and second LPFs 813a and 813b. In an embodiment, the antenna module 310 may store the magnitudes $X_{ref,I}$ and $X_{ref,Q}$ and phase $\phi_{ref}$ of the obtained coupling signal in a memory (e.g., the memory 130).

According to an embodiment, in operation 720, the antenna module 310 may transmit the reference signal SB and may obtain a reception signal, when the target object 390 is present. For example, the antenna module 310 may transmit the reference signal SB through the first antenna element 311 and may receive the reception signal through the fourth antenna element 314. The reception signal may include the coupling signal and the reflection signal reflected from a target object.

According to an embodiment, in operation 730, the antenna module 310 may remove the coupling signal from the reception signal and may obtain the reflection signal. For example, referring to FIG. 9A, the antenna module 310 may include a carrier synchronization circuit 910 and a coupling elimination circuit 920.

According to various embodiments, the carrier synchronization circuit 910 may include a VCO 911, third and fourth mixers 912a and 912b, third and fourth LPFs 913a and 913b, and a phase detector 914. For example, the coupling signal CP may be expressed as in Equation 3, and the reflection signal DS may be expressed as in Equation 4. At this time, the reception signal RS received by the fourth antenna element 314 may be expressed as in Equation 5 (node ①).

$$CP = A_{cp} \cos(\omega_c t + \phi_{c,cp}) \cdot \cos(\omega_b t + \phi_{b,cp}) \quad \text{[Equation 3]}$$

$$DS = A_{ds} \cos(\omega_c t + \phi_{c,ds}) \cdot \cos(\omega_b t + \phi_{b,ds}) \quad \text{[Equation 4]}$$

$$RS = A_{cp} \cos(\omega_c t + \phi_{c,cp}) \cdot \cos(\omega_b t + \phi_{b,cp}) + A_{ds} \cos(\omega_c t + \phi_{c,ds}) \cdot \cos(\omega_b t + \phi_{b,ds}) \quad \text{[Equation 5]}$$

The reception signal RS may be converted into the I/Q signal through the third and fourth mixers 912a and 912b. The VCO 911 may deliver a signal for converting the reception signal RS into the I/Q signal to the third and fourth mixers 912a and 912b. I signal SI and Q signal SQ may be expressed as in Equation 6 and Equation 7 (node ② and node ③). At this time, the phase detector 914 may control the VCO 911 to generate a signal delivered to the third and fourth mixers 912a and 912b based on the phase $\phi_{ref}$ of the coupling signal measured in operation 710. In this way, the reception signal RS may be converted into a form capable of removing the coupling signal from the coupling elimination circuit 920.

$$SI = A_{cp} \cos(2\omega_c t + 2\phi_{c,cp}) \cdot \cos(\omega_b t + \phi_{b,cp}) + A_{cp} \cos(\omega_b t + \phi_{b,cp}) + A_{ds} \cos(2\omega_c t + \phi_{c,ds} + \phi_{c,ref}) \cdot \cos(\omega_b t + \phi_{b,ds}) + A_{ds} \cos(\omega_b t + \phi_{b,ds}) \cdot \cos \Delta\phi_c \quad \text{[Equation 6]}$$

$$SQ = A_{cp} \sin(2\omega_c t + 2\phi_{c,cp}) \cdot \cos(\omega_b t + \phi_{b,cp}) - A_{cp} \cos(\omega_b t + \phi_{b,cp}) + A_{ds} \cos(2\omega_c t + \phi_{c,ds} + \phi_{c,cp}) \cdot \cos(\omega_b t + \phi_{b,ds}) - A_{ds} \cos(\omega_b t + \phi_{b,ds}) \cdot \sin \Delta\phi_c \quad \text{[Equation 7]}$$

When I signal SI and Q signal SQ pass through the third and fourth LPFs 913a and 913b, I signal SI and Q signal SQ may be converted as shown in Equation 8 and Equation 9 (node ④ and node ⑤). In Equation 8 and Equation 9, $\Delta\phi_c$ is expressed instead of $|\phi_{c,ds} - \phi_{c,cp}|$.

$$SI = A_{cp} \cos(\omega_b t + \phi_{b,cp}) + A_{ds} \cos(\omega_b t + \phi_{b,ds}) \cdot \cos \Delta\phi_c \quad \text{[Equation 8]}$$

$$SQ = -A_{cp} \cos(\omega_b t + \phi_{b,cp}) - A_{ds} \cos(\omega_b t + \phi_{b,ds}) \cdot \sin \Delta\phi_c \quad \text{[Equation 9]}$$

In Equations 8 and 9, the reception signal RS may be converted into I signal SI and Q signal SQ, which have a baseband frequency $\omega_b$ (e.g., 200 MHz or 400 MHz) at a high-band frequency $\omega_c$ (e.g., 28 GHz).

According to various embodiments, the coupling elimination circuit 920 may include first and second eliminators 921a and 921b, fifth and sixth mixers 922a and 922b, a phase difference detector 923, and a synthesizer 924. For example, the coupling elimination circuit 920 may remove I/Q components of the coupling signal obtained in operation 710 from I signal SI and Q signal SQ in Equation 8 and Equation 9 through the first and second eliminators 921a and 921b and may obtain the I/Q components DSI and DSQ of the reflection signal DS as shown in Equation 10 and Equation 11 (Node ⑥ and node ⑦).

$$DSI = A_{ds} \cos(\omega_b t + \phi_{b,ds}) \cdot \cos \Delta\phi_c \quad \text{[Equation 10]}$$

$$DSQ = -A_{ds} \cos(\omega_b t + \phi_{b,ds}) \cdot \sin \Delta\phi_c \quad \text{[Equation 11]}$$

The coupling elimination circuit 920 may compensate for a phase offset generated by the carrier synchronization circuit 910 through the fifth and sixth mixers 922a and 922b. The phase difference detector 923 may detect a phase offset from the output signals of the fifth and sixth mixers 922a and 922b and then may generate signals to be mixed by the fifth and sixth mixers 922a and 922b. The synthesizer 924 may synthesize the I/Q components DSI and DSQ of the reflection signal DS to obtain the reflection signal DS (e.g., $X_{sig}$). In the synthesizer 924, a process of synthesizing the I/Q components DSI and DSQ of the reflection signal DS may be expressed as Equation 12.

$$A_{ds} \cos(\omega_b t + \phi_{b,ds}) \cdot (\cos^2 \Delta\phi_c + \sin^2 \Delta\phi_c) \rightarrow A_{ds} \cos(\omega_b t + \phi_{b,ds}) \quad \text{[Equation 12]}$$

According to an embodiment, the antenna module 310 may measure a distance to the target object 390, using phase information of the reflection signal. For example, the antenna module 310 may store a graph (or lookup table) indicating the relationship between the phase of the reflection signal of FIG. 6 and the distance to the target object 390, in a memory (e.g., the memory 130). The antenna module 310 may obtain the distance to the target object 390 by applying the phase information of the obtained reflection signal to the graph (or lookup table) of FIG. 6.

FIG. 10 is a table illustrating an example of a signal transmitting method used in an antenna module according to an embodiment. FIG. 10 illustrates a time division duplex (TDD) slot structure 1000, for example.

Referring to FIG. 10, the antenna module 310 may transmit and receive signals through the TDD scheme. For example, the antenna module 310 may transmit and receive signals through a plurality of slots. The plurality of slots may include a downlink slot "D" for receiving a signal or an uplink slot "U" for transmitting a signal. In addition, the antenna module 310 may include a flexible slot "F" that does not perform any operation. In an embodiment, in the case of the flexible slot "F," the antenna module 310 may perform the distance measurement operation of FIG. 7.

According to various embodiments, a slot (e.g., the uplink slot "U," downlink slot "D," or flexible slot "F") may be a time division unit of data being transmitted.

Figure 11:
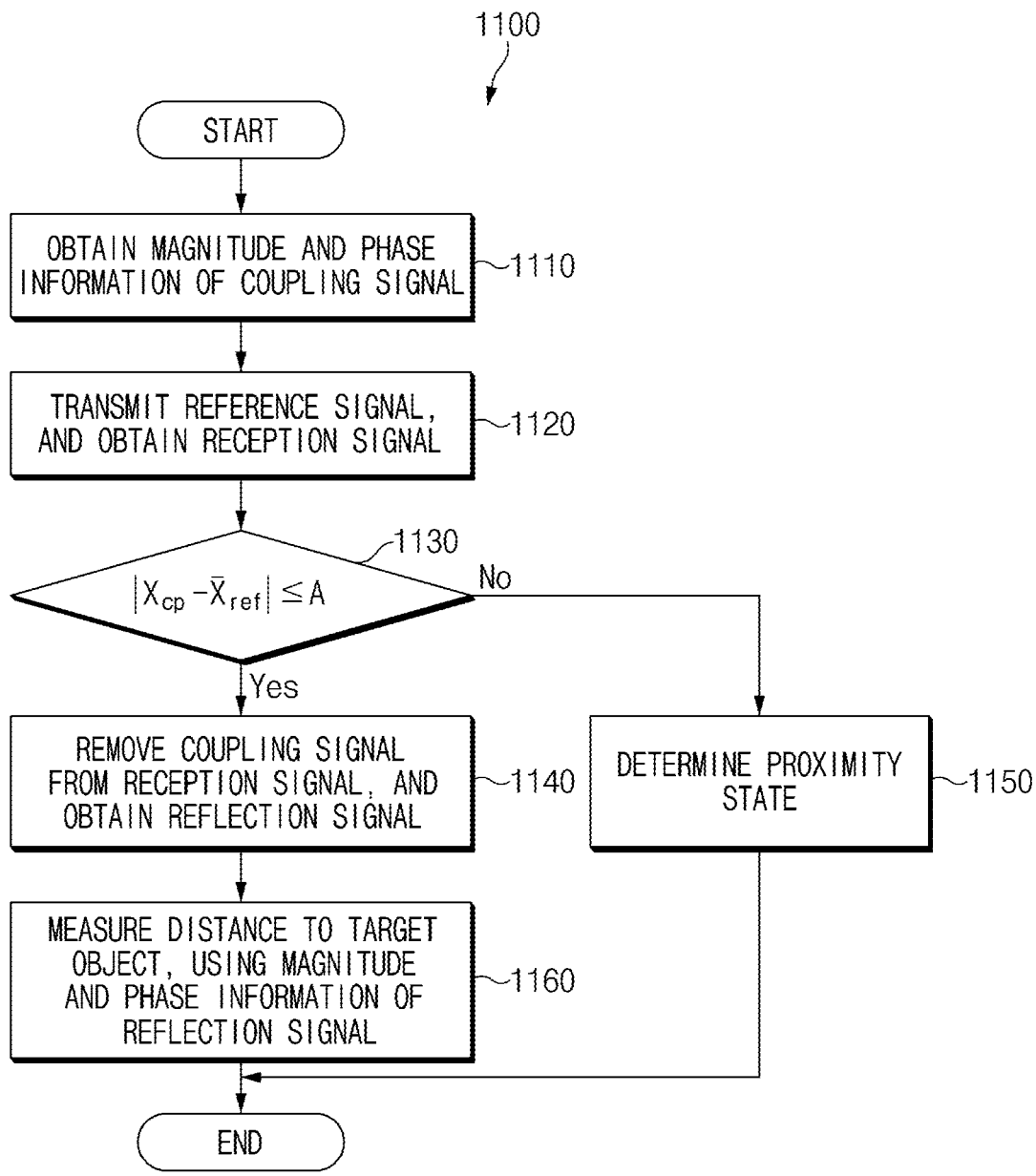
FIG. 11 is a flowchart illustrating a method, in which an antenna module determines whether a target object is in a proximity state, according to an embodiment.
Figure 12:
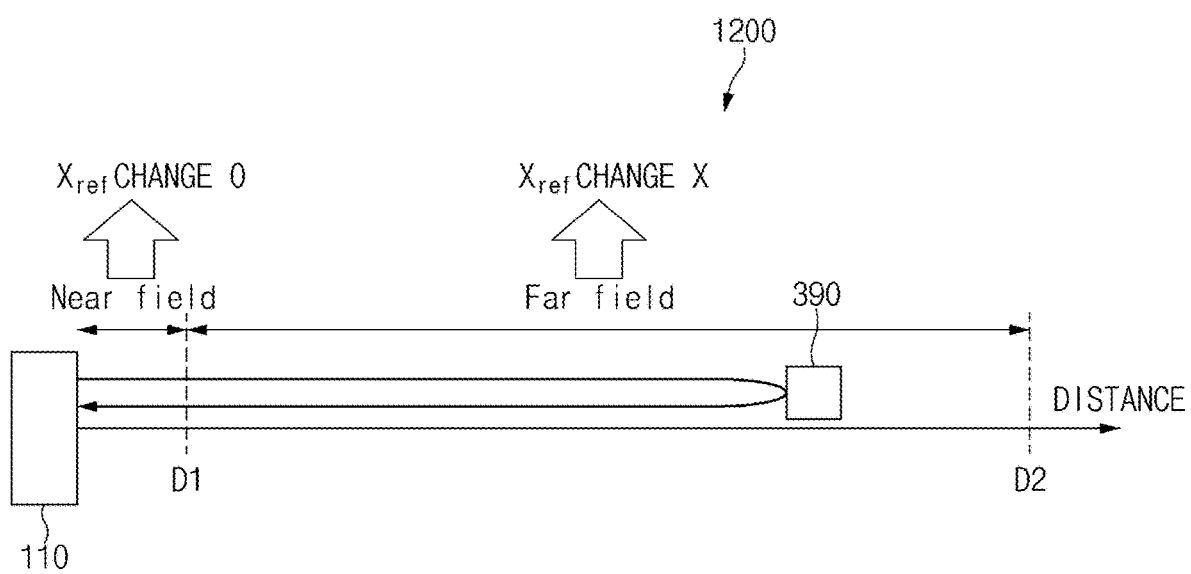
FIG. 12 is a diagram illustrating a method, in which an antenna module classifies proximity regions, according to an embodiment.

FIG. 11 is a flowchart illustrating a method 1100, in which an antenna module determines whether a target object is in a proximity state, according to an embodiment. FIG. 12 is a diagram illustrating a method 1200, in which an antenna module classifies proximity regions, according to an embodiment.

According to an embodiment, when the target object 390 is positioned at a distance closer than a first distance D1, the phase of a coupling signal may be changed, and thus the antenna module 310 may fail to determine the distance to the target object 390 by the method of FIG. 7.

According to an embodiment, in operation 1110, the antenna module 310 may obtain the magnitude and phase information of the coupling signal (see operation 710 in FIG. 7). In operation 1120, the antenna module 310 may transmit a reference signal and may obtain a reception signal (see operation 720 of FIG. 7). In operation 1130, the antenna module 310 may determine whether a difference between the magnitude Xcp of the current coupling signal and the magnitude Xref of the coupling signal obtained in operation 1110 is not greater than the reference value "A." In operation 1140 and operation 1160, when the difference between the magnitude Xcp of the current coupling signal and the magnitude Xref of the coupling signal obtained in operation 1110 is not greater than a reference value "A," the antenna module 310 may remove the coupling signal from the reception signal and may measure the distance to the target object 390, using the phase information of the reflection signal (see operation 730 and operation 740 of FIG. 7). In operation 1150, when the difference between the magnitude Xcp of the current coupling signal and the magnitude Xref of the coupling signal obtained in operation 1110 is greater than the reference value "A," the antenna module 310 may determine that the target object 390 is in a proximity state (e.g., the state closer than first distance D1, where the first distance D1 is about 2 cm). When it is determined that the target object 390 is in the proximity state, the electronic device (e.g., the electronic device 101) may reduce the transmission or reception power of the antenna module 310.

Figure 13:
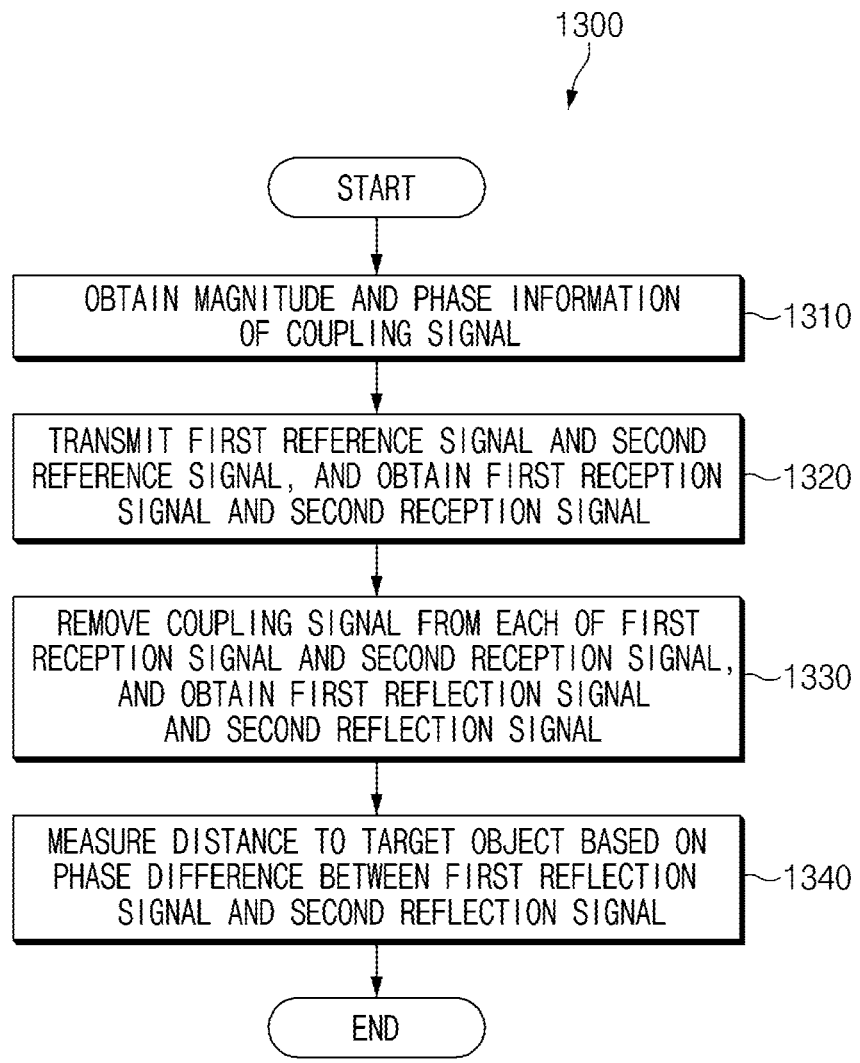
FIG. 13 is a flowchart illustrating a method, in which an antenna module measures a distance to a target object based on a phase of a reflection signal, according to various embodiments.
Figure 14:
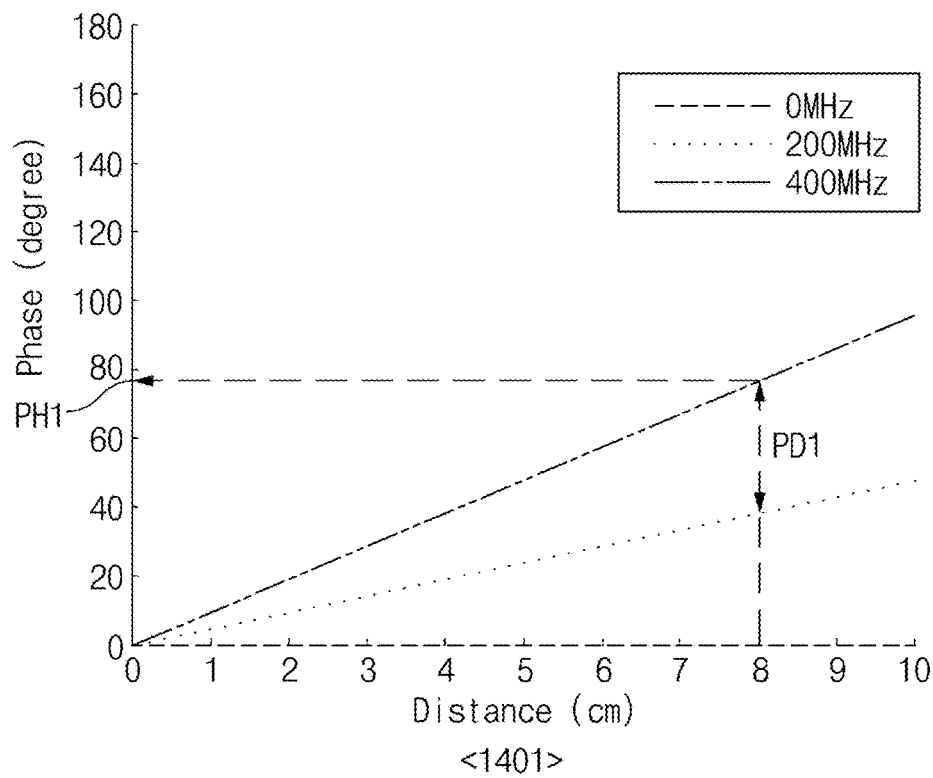
FIG. 14 is a graph illustrating a relationship between phases of reflection signals corresponding to a carrier frequency and a distance to a target object depending on whether an offset is present, according to an embodiment.
Figure 14:
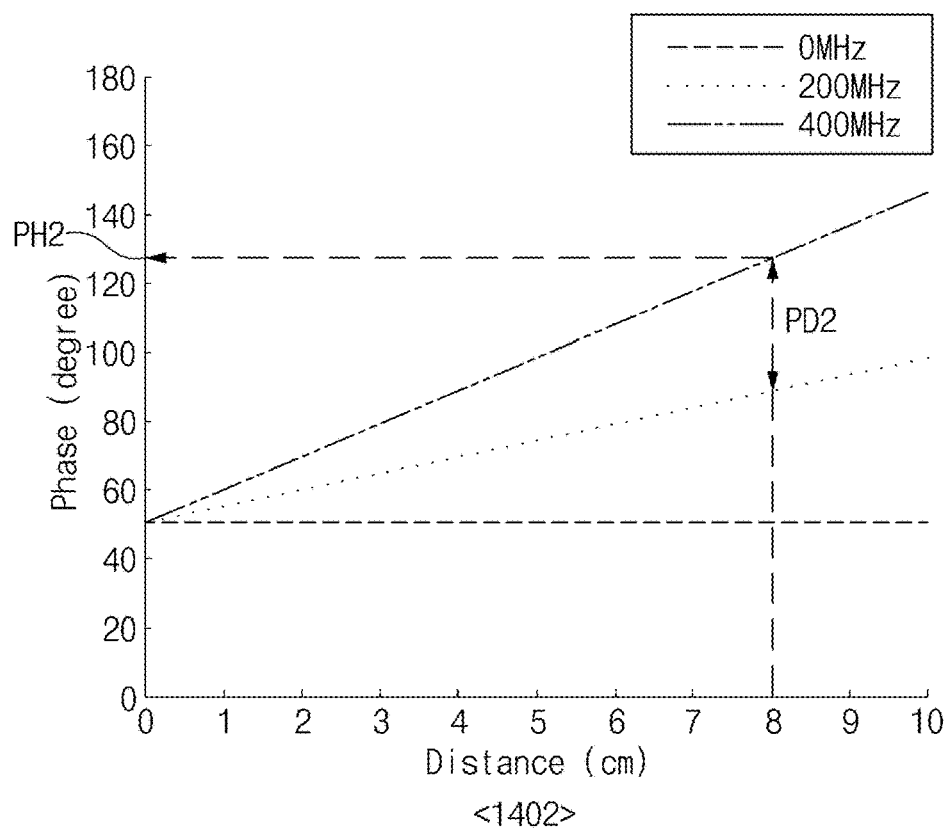

FIG. 13 is a flowchart illustrating a method 1300, in which an antenna module measures a distance to a target object based on a phase of a reflection signal, according to various embodiments. FIG. 14 is a graph illustrating a relationship between phases of reflection signals corresponding to a carrier frequency and a distance to a target object depending on whether a phase offset is present, according to an embodiment. In FIG. 14, a first graph 1401 is a graph illustrating a relationship between phases of reflection signals and a distance to a target object when there is no phase offset. In FIG. 14, a second graph 1402 is a graph illustrating a relationship between phases of reflection signals and a distance to a target object when the phase offset is present.

Referring to FIGS. 13 and 14, in the case where the phase offset is present, when a single reference signal is used, the distance to the target object 390 may not be accurately measured. For example, in the case where the phase offset is not present in the first graph 1401 of FIG. 14, when the distance to the target object 390 is 8 cm, the phase of the reflection signal may be measured as a first phase PH1. In the case where the phase offset is present in the second graph 1402 of FIG. 14, when the distance to the target object 390 is 8 cm, the phase of the reflection signal may be measured as a second phase PH2. However, even when the phase offset is present, the phase difference between the reflection signals obtained by the two reference signals may be constantly maintained (e.g., PD1 and PD2 are the same as each other in FIG. 14). Accordingly, the antenna module 310 may accurately measure the distance to the target object 390, using the phase difference of reflection signals corresponding to a plurality of reference signals.

According to an embodiment, in operation 1310, the antenna module 310 may obtain the magnitude and phase information of the coupling signal (see operation 710 in FIG. 7). In operation 1320, the antenna module 310 may transmit a first reference signal (e.g., the reference signal of 200 MHz) and a second reference signal (e.g., the reference signal of 400 MHz), and then may obtain a first reception signal and a second reception signal corresponding to a first reference signal and a second reference signal, respectively (see operation 720 of FIG. 7). In operation 1330, the antenna module 310 may remove a coupling signal from each of the first reception signal and the second reception signal and then may obtain a first reflection signal and a second reflection signal (see operation 730 of FIG. 7). In operation 1340, the antenna module 310 may calculate a phase difference between a first reflection signal and a second reflection signal and may obtain a distance to the target object 390 based on the phase difference. The antenna module 310 may store the graph of FIG. 14 in a memory (e.g., the memory 130) and may calculate a distance to the target object 390, using the graph of FIG. 14.

Figure 15:
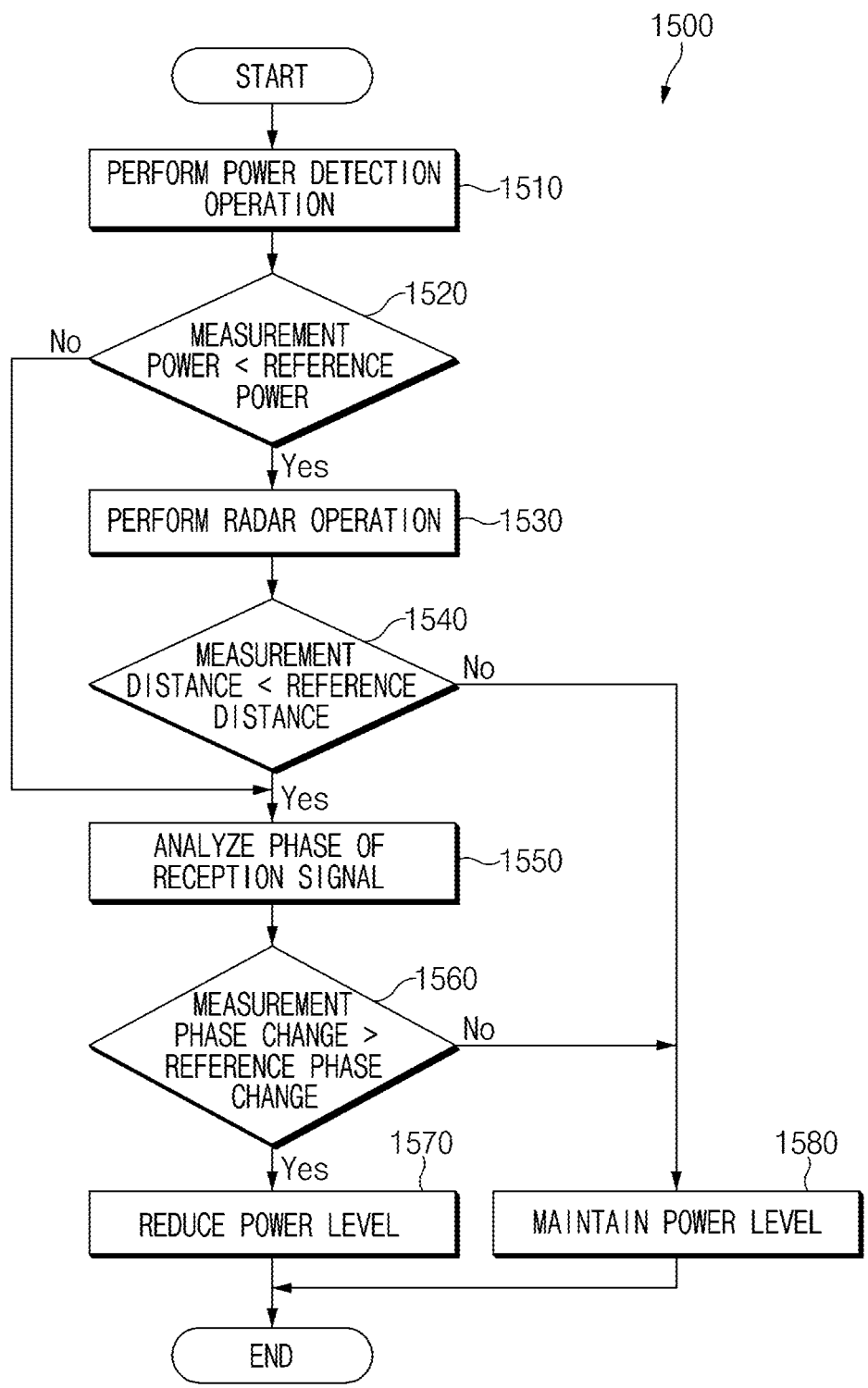
FIG. 15 is a flowchart illustrating a method, in which an antenna module measures a distance to a target object through power detection and radar operations, according to an embodiment.
Figure 16:
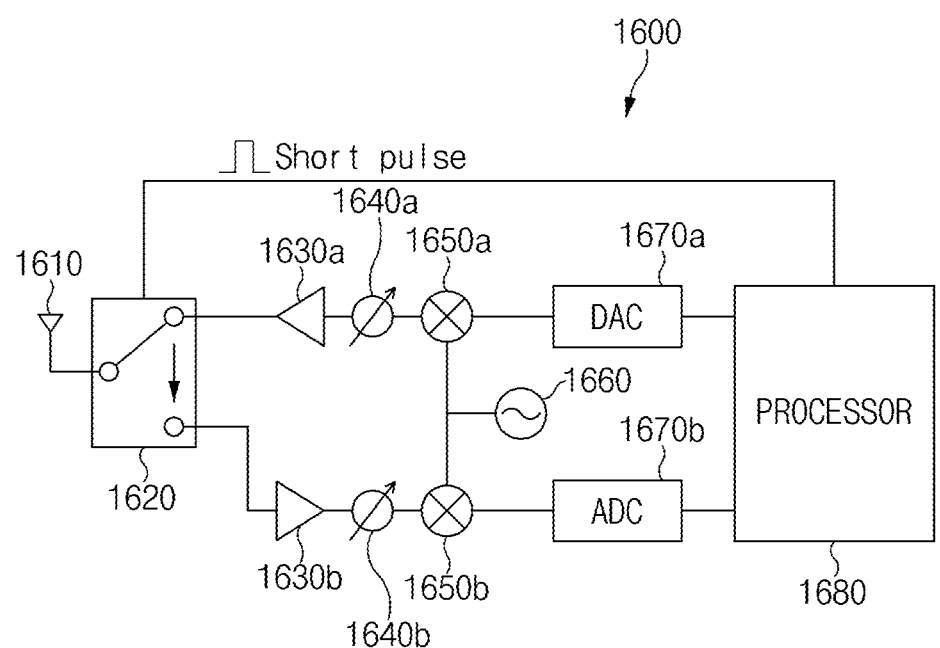
FIG. 16 is a diagram illustrating an example of an antenna module measuring a distance to a target object through a radar operation.
Figure 17:
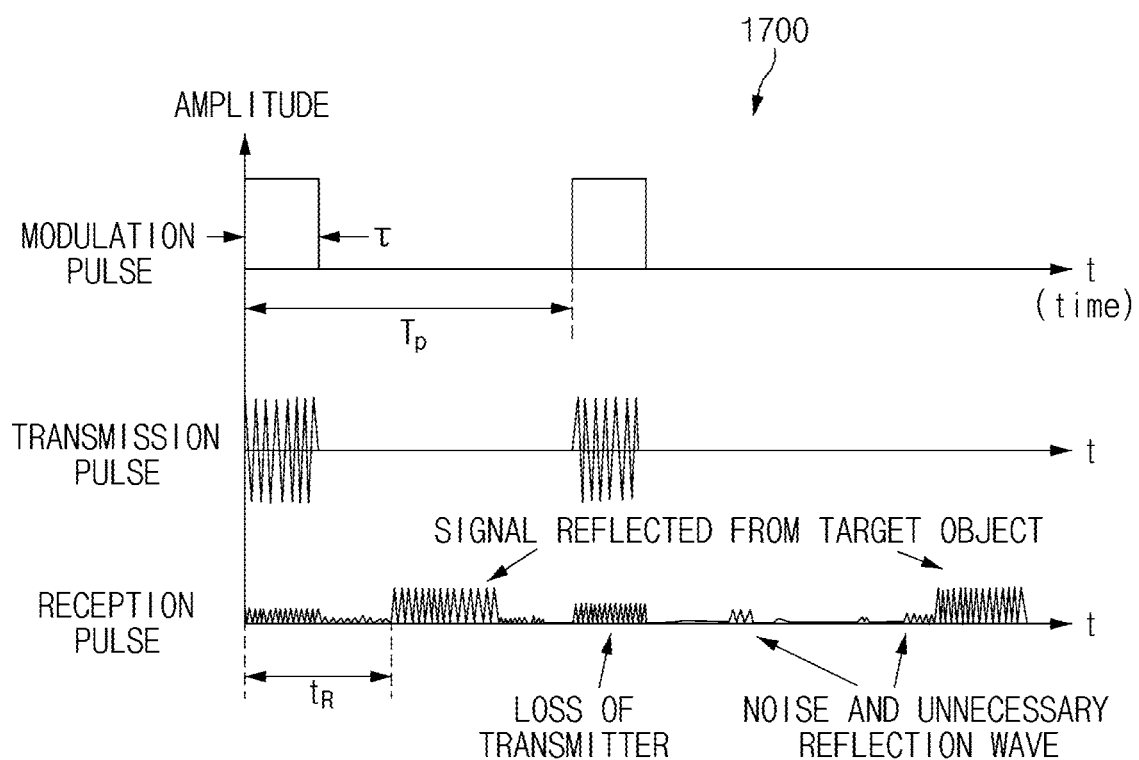
FIG. 17 illustrates a pulse signal transmitted and received by an antenna module during a radar operation according to an embodiment.
Figure 18:
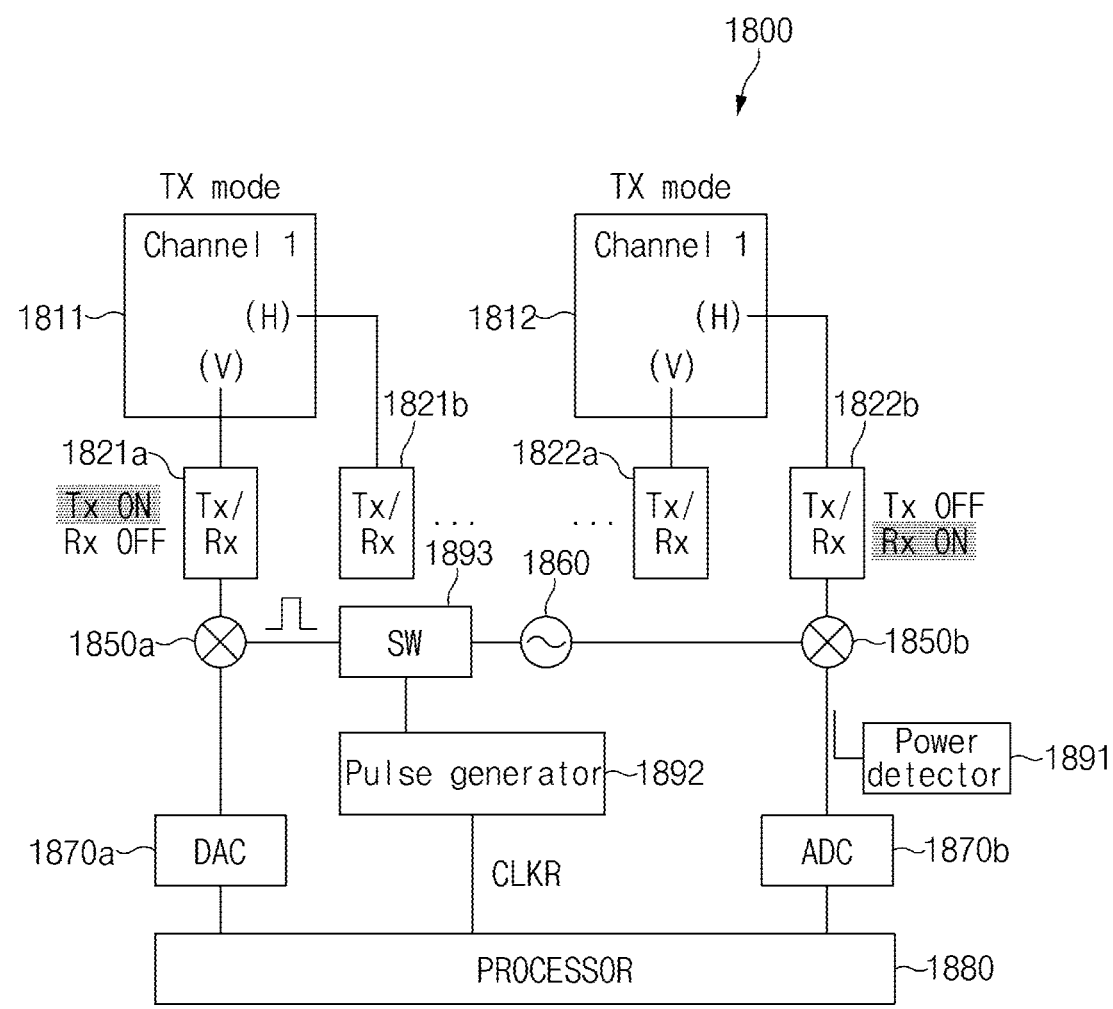
FIG. 18 is a diagram illustrating various examples of an antenna module measuring a distance to a target object through power detection and radar operations.

FIG. 15 is a flowchart illustrating a method 1500, in which an antenna module measures a distance to a target object through power detection and radar operations, according to an embodiment. FIG. 16 is a diagram illustrating an example of an antenna module measuring a distance to a target object through a radar operation. FIG. 17 illustrates timing 1700 of a pulse signal transmitted and received by an antenna module during a radar operation according to an embodiment. FIG. 18 is a diagram illustrating various examples of an antenna module measuring a distance to a target object through power detection and radar operations.

Referring to FIGS. 15 to 18, the antenna module 310 may measure a distance to the target object 390 through a power detection operation and a radar operation. In FIG. 15, the antenna module 310 may include a power detection and radar operation circuit 1600. In FIG. 18, the antenna module 310 may include a power detection and radar operation circuit 1800.

According to an embodiment, in operation 1510, a processor 1680 or 1880 may perform a power detection operation. For example, the antenna module 310 may transmit the transmission pulse of FIG. 17 through at least one antenna element, may receive the reception pulse of FIG. 17 through at least one antenna element, and may measure the power reflected from the target object 390. For example, in FIG. 16, the processor 1680 may control the switch 1620 to transmit the transmission pulse and to receive the reception pulse. The processor 1680 may analyze the received pulse and then may measure the power reflected from the target object 390. In various examples, the power detector 1891 of FIG. 18 may measure the power reflected from the target object 390 and may deliver the measured result to the processor 1880. A power detector 1891 may be integrated in the antenna module 310.

According to an embodiment, in operation 1520, the processor 1680 or 1880 may compare the power measured in operation 1520 with the reference power. For example, when the measured power is less than the reference power, the processor 1680 or 1880 may perform operation 1530. Alternatively, when the measured power is not less than the reference power, the processor 1680 or 1880 may perform operation 1550.

According to an embodiment, when the power measured in operation 1520 is less than the reference power, in operation 1530, the processor 1680 or 1880 may perform a radar operation. For example, the antenna module 310 may operate as radar under the control of the processor 1680 or 1880. For example, in FIG. 16, the processor 1680 may apply the modulation pulse of FIG. 17 to the switch 1620, may transmit the transmission pulse of FIG. 17 through the antenna element 1610, and may receive the reception pulse of FIG. 17 through the antenna element 1610 after a specific time $t_R$. The processor 1680 may measure the distance to the target object 390 by analyzing the signal reflected from the target object of FIG. 17. In various examples, in FIG. 18, the antenna module 310 may include a high speed switching circuit 1892 and a switch 1893. The processor 1880 may provide a reference clock CLKR to the high speed switching circuit 1892, and the antenna module 310 may generate the transmission pulse of FIG. 17 through the high speed switching circuit 1892 and the switch 1893. The processor 1880 may transmit the transmission pulse of FIG. 17 through the first channel 1811 and may receive the reception pulse of FIG. 17 through the second channel 1812. The processor 1880 may measure a distance to the target object 390 by analyzing the signal reflected from the target object of FIG. 17.

According to an embodiment, in operation 1540, the processor 1680 or 1880 may compare the measurement distance obtained through operation 1530 with the reference distance. For example, when the measurement distance is smaller than the reference distance, the processor 1680 or 1880 may perform operation 1550. Because the MPE restrictions are not applied when the measurement distance is not less than the reference distance, in operation 1580, the processor 1680 or 1880 may maintain the power level of the antenna module 310 at a current state.

According to various embodiments, the power level of the antenna module 310 may be a transmission power of a signal or a reception power of a signal in the antenna module 310.

According to an embodiment, in operation 1550, the processor 1680 or 1880 may analyze the phase of the reception pulse. For example, when there is no phase change between the transmission pulse and the reception pulse, the target object 390 may be determined as an object (e.g., metal) having a uniform medium. Alternatively, when the phase change between the transmission pulse and the reception pulse is greater than the reference phase change, the target object 390 may be determined as a human body.

According to an embodiment, in operation 1560, the processor 1680 or 1880 may compare the measurement phase change with the reference phase change. For example, when the measurement phase change is greater than the reference phase change, it may be determined that the target object 390 is a human body; in operation 1570, the processor 1680 or 1880 may reduce the power level of the antenna module 310. Alternatively, when the measurement phase change is less than the reference phase change, it may be determined that the target object 390 is an object (e.g., metal) having a uniform medium; in operation 1580, the processor 1680 or 1880 may maintain the power level of the antenna module 310 at the current state.

Figure 19:
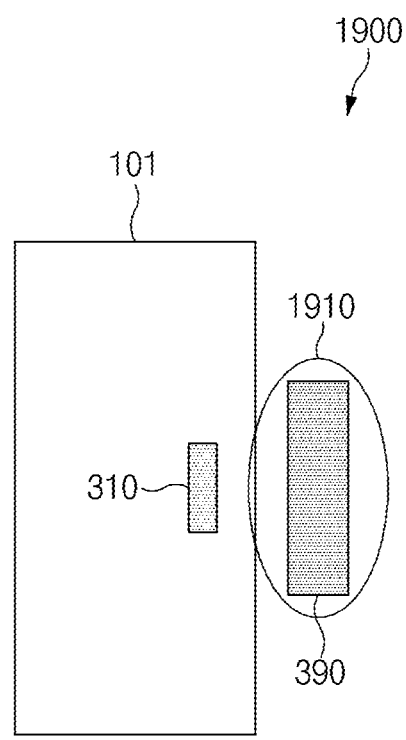
FIG. 19 is a diagram illustrating an operation method of an antenna module in an electronic device when an entire area of a transmission beam of an antenna module is blocked by a target object, according to an embodiment.
Figure 20:
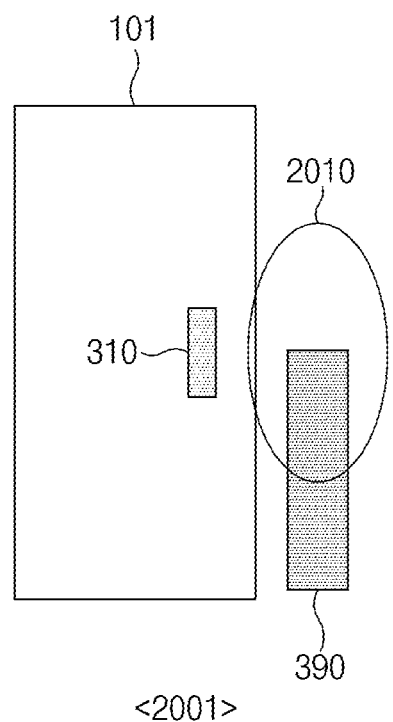
FIG. 20 is a diagram illustrating an operation method of an antenna module in an electronic device when a partial area of a transmission beam of an antenna module is blocked by a target object, according to an embodiment.
Figure 20:
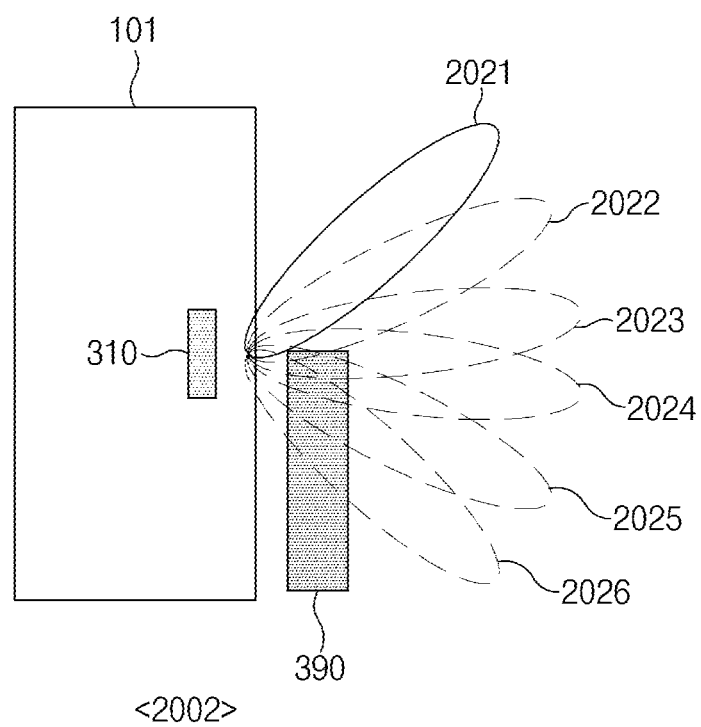

FIG. 19 is a diagram illustrating an operation method of an antenna module in an electronic device when an entire area of a transmission beam of an antenna module is blocked by a target object, according to an embodiment. FIG. 20 is a diagram illustrating an operation method of an antenna module in an electronic device when a partial area of a transmission beam of an antenna module is blocked by a target object, according to an embodiment. The antenna module 310 may form a transmission beam with a wide beam, using one antenna element, and may form a reception beam with a narrow beam, using a plurality of antenna elements.

Referring to FIG. 19, in the network environment 1900 of the electronic device 101, the target object 390 may block the entire area of a transmission beam 1910. For example, the antenna module 310 may form the transmission beam 1910 as a wide beam. The antenna module 310 may measure a distance to the target object 390 and whether the target object 390 is present, using the method described in FIGS. 3 to 18. When it is determined that the entire area of the transmission beam 1910 is blocked by the target object 390 as shown in FIG. 19, the antenna module 310 may reduce the power level of a signal for the entire area of the transmission beam 1910.

Referring to FIG. 20, the target object 390 may block only the partial area of a transmission beam 2010. For example, in the network environment 2001 of the electronic device 101, the antenna module 310 may generate the transmission beam 2010 as a wide beam. The antenna module 310 may measure a distance to the target object 390 and whether the target object 390 is present, using the method described in FIGS. 3 to 18. For example, the antenna module 310 may form one of a first reception beam 2021, a second reception beam 2022, a third reception beam 2023, a fourth reception beam 2024, a fifth reception beam 2025, or a sixth reception beam 2026, as a narrow beam. When it is determined that the partial area of the transmission beam 2010 is blocked due to the target object 390, the antenna module 310 may form the first reception beam 2021 in a direction not blocked by the target object 390, in the network environment 2002 of the electronic device 101. The antenna module 310 may transmit or receive a signal without reducing the power level through the first reception beam 2021.

FIGS. 21 to 24 are diagrams illustrating operation methods of an antenna module in an electronic device when a partial area of a communication beam (e.g., a transmission beam or reception beam) of an antenna module is blocked by a human body, according to various embodiments. FIG. 25 is a diagram illustrating an operation method of an antenna module in an electronic device when a partial area of a communication beam (e.g., a transmission beam or reception beam) of an antenna module is blocked by a target object other than a human body, according to various embodiments.

Referring to FIGS. 21 to 25, the antenna module 310 may form a transmission beam with a wide beam, using one antenna element, and may form a reception beam with a narrow beam, using a plurality of antenna elements. Alternatively, the antenna module 310 may form a transmission beam with a narrow beam, using a plurality of antenna elements, and may form a reception beam with a narrow beam, using the plurality of antenna elements. The antenna module 310 may measure a location of a target object (e.g., a human body 390a or a nonhuman 390b) and a distance to the target object, using the method described in FIGS. 3 to 18. The antenna module 310 may determine the type of the target object (e.g., the human body 390a or the nonhuman 390b), using the method described in FIG. 15.

Figure 21:
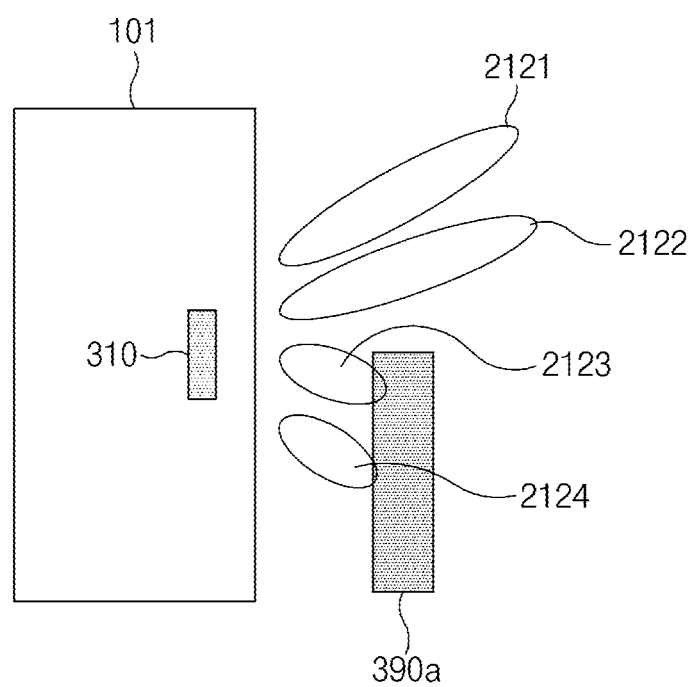
FIG. 21 is a diagram illustrating an operation method of an antenna module in an electronic device when a partial area of a communication beam of an antenna module is blocked by a human body, according to an embodiment.

According to an embodiment, in FIG. 21, the antenna module 310 may reduce the power levels of communication beams 2123 and 2124 (e.g., a transmission beam or reception beam) blocked by the human body 390a. The antenna module 310 may maintain the power levels of communication beams 2121 and 2122 (e.g., a transmission beam or reception beam) not blocked by the human body 390a.

Figure 22:
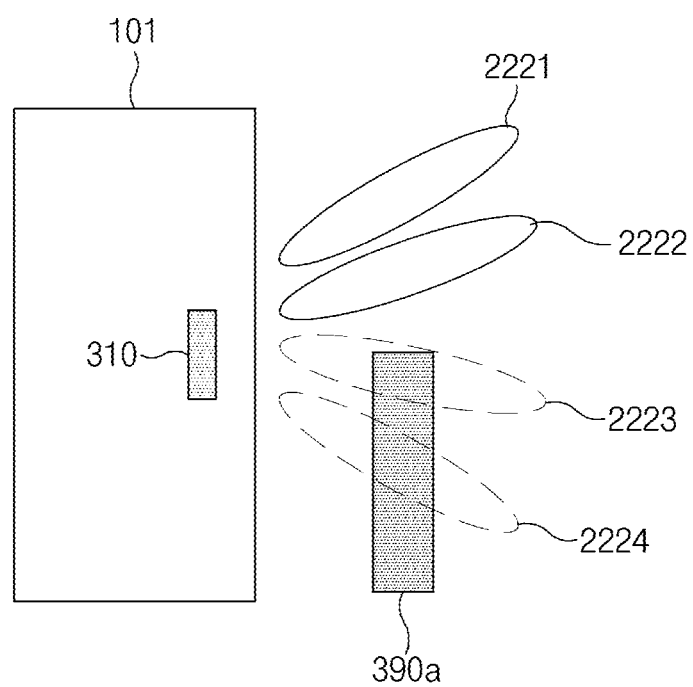
FIG. 22 is a diagram illustrating an operation method of an antenna module in an electronic device when a partial area of a communication beam of an antenna module is blocked by a human body, according to various embodiments.

According to an embodiment, in FIG. 22, the antenna module 310 may deactivate communication beams 2223 and 2224 (e.g., a transmission beam or reception beam) blocked by the human body 390a. The antenna module 310 may maintain the power levels of communication beams 2221 and 2222 (e.g., a transmission beam or reception beam) not blocked by the human body 390a.

Figure 23:
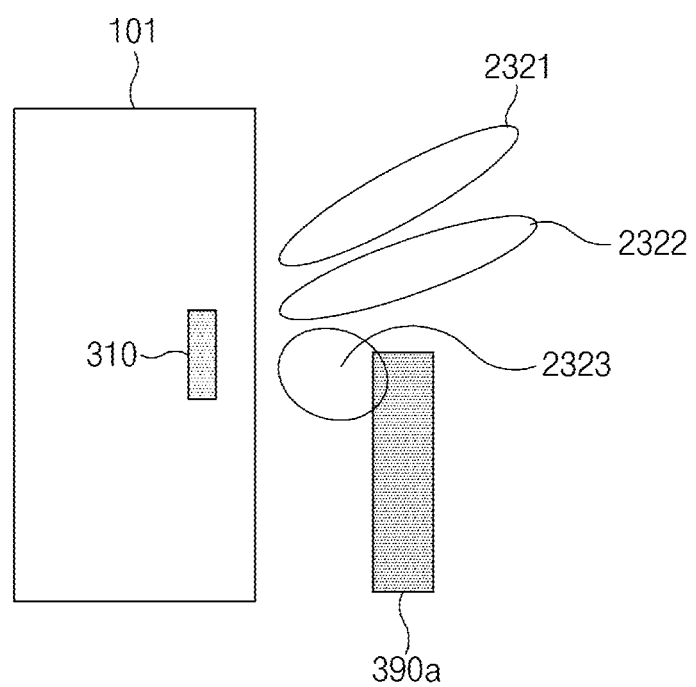
FIG. 23 is a diagram illustrating an operation method of an antenna module in an electronic device when a partial area of a communication beam of an antenna module is blocked by a human body, according to various embodiments.

According to an embodiment, in FIG. 23, the antenna module 310 may change a communication beam 2323 (e.g., a transmission beam or reception beam) blocked by the human body 390a into a wide beam, and may reduce the power level of the communication beam 2323. The antenna module 310 may maintain the power levels of communication beams 2321 and 2322 (e.g., a transmission beam or reception beam) not blocked by the human body 390a.

Figure 24:
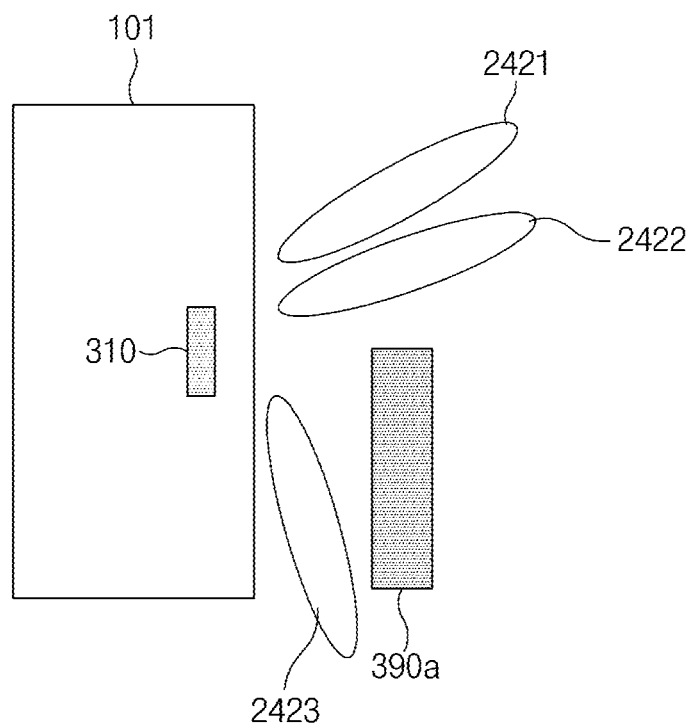
FIG. 24 is a diagram illustrating an operation method of an antenna module in an electronic device when a partial area of a communication beam of an antenna module is blocked by a human body, according to various embodiments.
Figure 25:
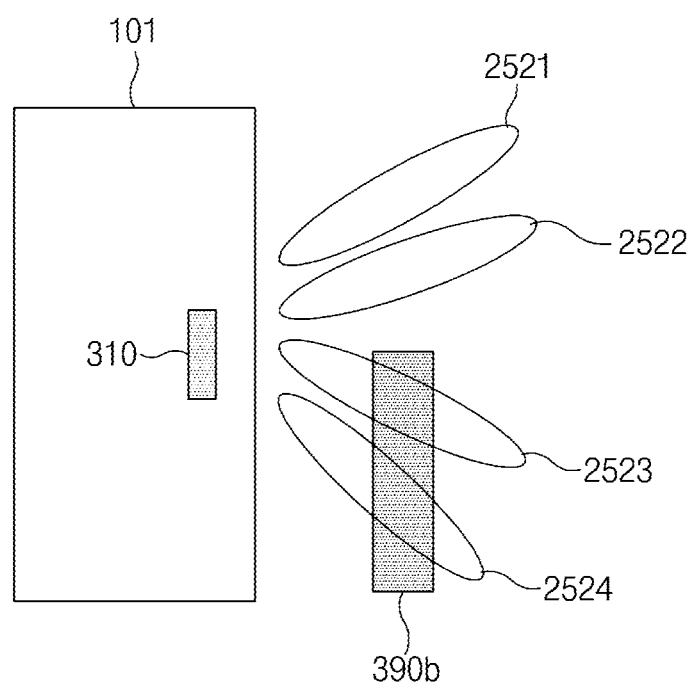
FIG. 25 is a diagram illustrating an operation method of an antenna module in an electronic device when a partial area of a communication beam of an antenna module is blocked by a target object other than a human body, according to various embodiments.

According to an embodiment, in FIG. 24, the antenna module 310 may change the direction of a communication beam 2423 (e.g., a transmission beam or reception beam) blocked by the human body 390a to a direction not blocked by the human body 390a (or generate the communication beam 2423 that avoids the human body 390a), and may maintain the power level of the communication beam 2423. The antenna module 310 may maintain the power levels of communication beams 2421 and 2422 (e.g., a transmission beam or reception beam) not blocked by the human body 390a.

According to an embodiment, in FIG. 25, when being blocked by the nonhuman 390b (e.g., metal), the antenna module 310 may maintain the power levels of communication beams 2521, 2522, 2523, and 2524 (e.g., a transmission beam or reception beam) regardless of the blocked portion. In various embodiments, the antenna module 310 may reduce the power levels of the communication beams 2523 and 2524 blocked by the nonhuman 390b. Alternatively, the antenna module 310 may deactivate the communication beams 2523 and 2524 blocked by the nonhuman 390b.

According to various embodiments, an electronic device (e.g., the electronic device 101) may include an antenna module (e.g., the antenna module 310) including a first antenna element (e.g., the first antenna element 311) and a second antenna element (e.g., the fourth antenna element 314), and a processor (e.g., the processor 120) operatively connected to the antenna module. The processor may be configured to transmit a first signal (e.g., the reference signal SA) through the first antenna element, to receive a second signal (e.g., the reception signal SB) including a signal obtained as the first signal is reflected by a target object (e.g., the target object 390), through the second antenna element, to calculate a distance from the antenna module to the target object based on a phase of the second signal, and to reduce a power level of the antenna module when the distance to the target object is smaller than a reference distance.

According to various embodiments, the first antenna element and the second antenna element may be are formed to include a first polarization and a second polarization. The processor may be configured to transmit the first signal, using the first polarization (e.g., the first polarization 311a) of the first antenna element and to receive the second signal, using the second polarization (e.g., the second polarization 314b) of the second antenna element, through the antenna module.

According to various embodiments, the second signal may include a coupling signal by the first signal and a reflection signal by the target object. The processor may be configured to remove the coupling signal from the second signal to obtain the reflection signal and to calculate the distance to the target object based on a phase of the reflection signal, through the antenna module.

According to various embodiments, the processor may be configured to obtain a magnitude and a phase of the coupling signal through the antenna module in a state where the target object is not present.

According to various embodiments, the processor may be configured to convert the second signal into a baseband signal based on the phase of the coupling signal, through the antenna module, to remove the magnitude of the coupling signal from the baseband signal, and to correct a phase offset occurring in a process of converting the baseband signal to obtain the reflection signal.

According to various embodiments, the processor may be configured to transmit a third signal through the first antenna element, to receive a fourth signal through the second antenna element, to remove a coupling signal obtained in advance from the second signal to obtain a first reflection signal, and to remove the coupling signal from the fourth signal to obtain a second reflection signal, through the antenna module.

According to various embodiments, the processor may be configured to calculate the distance to the target object based on a phase difference between the first reflection signal and the second reflection signal, through the antenna module.

According to various embodiments, through the antenna module, the processor may be configured to measure a first coupling signal in a state where the target object is not present, to measure a second coupling signal in a state where the target object is present, and to determine a proximity state where the distance to the target object is smaller than a specified distance, when a magnitude difference between the first coupling signal and the second coupling signal is greater than a reference magnitude.

According to various embodiments, the antenna module may perform uplink or downlink of a signal for data transmission through a plurality of slots (e.g., downlink D or uplink U). The processor may be configured to transmit the first signal through a flexible slot (e.g., the flexible slot F) in which the uplink or downlink of the signal for the data transmission is not performed, through the antenna module.

According to various embodiments, the processor may be configured not to reduce a power level for a reception beam of the antenna module facing in a direction not blocked by the target object when the target object blocks a partial area of a transmission beam of the antenna module.

According to various embodiments, an electronic device may include an antenna module including a first antenna element and a second antenna element, and a processor operatively connected to the antenna module. The processor may be configured to transmit a first signal through the first antenna element, to receive a second signal including a signal obtained as the first signal is reflected by a target object, through the second antenna element, to perform a radar operation, using the first signal when a power level of the second signal is less than a reference power level, to determine a phase change of the second signal when a distance, which is measured by the radar operation, from the antenna module to the target object is smaller than a reference distance, and to reduce a power level of the antenna module when the phase change of the second signal is greater than a reference phase change.

According to various embodiments, the first signal may include a pulse signal transmitted depending on a specified time interval.

According to various embodiments, the processor may be configured to determine a phase change of the second signal when the power level of the second signal is not less than the reference power level, and to reduce the power level of the antenna module when the phase change of the second signal is greater than the reference phase change.

According to various embodiments, the processor may be configured to maintain the power level of the antenna module when the distance to the target object, which is measured by the radar operation, is not less than the reference distance.

According to various embodiments, the processor may be configured to maintain the power level of the antenna module when the phase change of the second signal is not greater than the reference phase change.

According to various embodiments, the antenna module may include a power detector (e.g., the power detector 1891) measuring the power level of the second signal.

According to various embodiments, the antenna module may include a high speed switching circuit (e.g., the high speed switching circuit 1892) generating the first signal.

According to various embodiments, the processor may be configured to provide a reference clock to the high speed switching circuit. The high speed switching circuit may generate the first signal having a frequency greater than the reference clock based on the reference clock.

According to various embodiments, the antenna module may perform uplink or downlink of a signal for data transmission through a plurality of slots. The processor may be configured to transmit the first signal through a flexible slot in which the uplink or downlink of the signal for data transmission is not performed, through the antenna module.

According to various embodiments, the processor may be configured not to reduce a power level for a reception beam of the antenna module facing in a direction not blocked by the target object when the target object blocks a partial area of a transmission beam of the antenna module.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the specification, it is possible to detect a distance to a target object without an additional distance sensor.

According to the embodiments disclosed in this specification, it is possible to control the transmission or reception power of an antenna module to satisfy MPE restrictions.

Besides, a variety of effects directly or indirectly understood through the disclosure may be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
    an antenna including a first antenna element and a second antenna element; and
    a processor operatively connected to the antenna, wherein the processor is configured to:
        transmit a first signal through the first antenna element;
        receive, through the second antenna element, a second signal including a signal obtained as the first signal, wherein the second signal is reflected by a target object;
        calculate a distance from the antenna to the target object based on a phase of the second signal; and
        when the distance to the target object is smaller than a reference distance, reduce a power level of the antenna,
    wherein the second signal includes a coupling signal by the first signal and a reflection signal by the target object, and
    wherein the processor is further configured to:
        remove the coupling signal from the second signal to obtain the reflection signal, and
        calculate the distance to the target object based on a phase of the reflection signal.

2. The electronic device of claim 1, wherein the first antenna element and the second antenna element are configured to include a first polarization and a second polarization, and
    wherein the processor is further configured to:
        transmit, through the antenna, the first signal using the first polarization of the first antenna element; and
        receive, through the antenna, the second signal using the second polarization of the second antenna element.

3. The electronic device of claim 1, wherein the processor is further configured to:
    obtain a magnitude and a phase of the coupling signal in a state where the target object is not present.

4. The electronic device of claim 3, wherein the processor is further configured to:
    convert the second signal into a baseband signal based on the phase of the coupling signal;
    remove the magnitude of the coupling signal from the baseband signal; and
    adjust a phase offset occurring in a process of converting the second signal into the baseband signal to obtain the reflection signal.

5. The electronic device of claim 1, wherein the processor is further configured to:
    transmit a third signal through the first antenna element;
    receive a fourth signal through the second antenna element;
    remove a coupling signal obtained in advance from the second signal to obtain a first reflection signal; and
    remove the coupling signal from the fourth signal to obtain a second reflection signal.

6. The electronic device of claim 5, wherein the processor is further configured to:
    calculate the distance to the target object based on a phase difference between the first reflection signal and the second reflection signal.

7. The electronic device of claim 1, wherein the processor is further configured to:
    measure a first coupling signal in a state where the target object is not present;
    measure a second coupling signal in a state where the target object is present; and
    when a magnitude difference between the first coupling signal and the second coupling signal is greater than a reference magnitude, determine a proximity state where the distance to the target object is smaller than a specified distance.

8. The electronic device of claim 1, wherein the antenna performs an uplink signal transmission or a downlink signal transmission for a data transmission through a plurality of slots including a flexible slot, and
    wherein the processor is further configured to:
        transmit, through the antenna, the first signal through the flexible slot in which the uplink signal transmission or the downlink signal transmission for the data transmission is not performed.

9. The electronic device of claim 1, wherein the processor is further configured to:
    when the target object blocks a partial area of a transmission beam of the antenna, not reduce a power level for a reception beam of the antenna facing in a direction not blocked by the target object.

10. An electronic device comprising:
    an antenna including a first antenna element and a second antenna element; and
    a processor operatively connected to the antenna, wherein the processor is configured to:
        transmit a first signal through the first antenna element;
        receive, through the second antenna element, a second signal including a signal obtained as the first signal, wherein the second signal is reflected by a target object;
        when a power level of the second signal is less than a reference power level, perform a radar operation using the first signal;
        when a distance, measured by the radar operation, from the antenna to the target object is smaller than a reference distance, determine a phase change of the second signal; and
        when the phase change of the second signal is greater than a reference phase change, reduce a power level of the antenna.

11. The electronic device of claim 10, wherein the first signal includes a pulse signal transmitted based on a specified time interval.

12. The electronic device of claim 10, wherein the processor is further configured to:
    when the power level of the second signal is not less than the reference power level, determine a phase change of the second signal; and when the phase change of the second signal is greater than the reference phase change, reduce the power level of the antenna.

13. The electronic device of claim 10, wherein the processor is further configured to:
when the distance to the target object is not less than the reference distance, maintain the power level of the antenna.

14. The electronic device of claim 10, wherein the processor is further configured to:
when the phase change of the second signal is not greater than the reference phase change, maintain the power level of the antenna.

15. The electronic device of claim 10, wherein the antenna includes a power detector measuring the power level of the second signal.

16. The electronic device of claim 10, wherein the antenna includes a high speed switching circuit generating the first signal.

17. The electronic device of claim 16, wherein the processor is further configured to provide a reference clock to the high speed switching circuit, and
wherein the high speed switching circuit generates the first signal including a frequency greater than the reference clock.

18. The electronic device of claim 10, wherein the antenna performs an uplink signal transmission or a downlink signal transmission for a data transmission through a plurality of slots including a flexible slot, and
wherein the processor is further configured to:
transmit, through the antenna, the first signal through the flexible slot in which the uplink signal transmission or the downlink signal transmission for the data transmission is not performed.

19. The electronic device of claim 10, wherein the processor is further configured to:
when the target object blocks a partial area of a transmission beam of the antenna, not reduce a power level for a reception beam of the antenna facing in a direction not blocked by the target object.

* * * * *